United States Patent
Handa et al.

(10) Patent No.: US 12,175,604 B2
(45) Date of Patent: Dec. 24, 2024

(54) AVATAR MOBILITY BETWEEN VIRTUAL REALITY SPACES

(71) Applicant: Cluster, Inc., Tokyo (JP)

(72) Inventors: Daiki Handa, Tokyo (JP); Hiroyuki Tomine, Tokyo (JP)

(73) Assignee: CLUSTER, INC., Tokyo (JP)

( * ) Notice: Subject to any disclaimer, the term of this patent is extended or adjusted under 35 U.S.C. 154(b) by 0 days.

(21) Appl. No.: 18/211,595

(22) Filed: Jun. 20, 2023

(65) Prior Publication Data

US 2023/0334782 A1    Oct. 19, 2023

Related U.S. Application Data

(63) Continuation of application No. 17/959,335, filed on Oct. 4, 2022, now Pat. No. 11,763,528.

(30) Foreign Application Priority Data

Oct. 6, 2021    (JP) ................................ 2021-164754

(51) Int. Cl.
  *G06T 19/00*    (2011.01)
  *G06T 13/40*    (2011.01)
  (Continued)

(52) U.S. Cl.
  CPC ............ *G06T 19/003* (2013.01); *G06T 13/40* (2013.01); *G06T 19/20* (2013.01); *G06V 10/761* (2022.01); *G06T 2219/024* (2013.01)

(58) Field of Classification Search
  None
  See application file for complete search history.

(56) References Cited

U.S. PATENT DOCUMENTS

| 10,290,144 B2 | 5/2019 | Makinen et al. |
| 11,099,397 B2 * | 8/2021 | Han .................... G02B 27/017 |

(Continued)

FOREIGN PATENT DOCUMENTS

| JP | 2016-62486 A | 4/2016 |
| JP | 2018-109835 A | 7/2018 |

(Continued)

OTHER PUBLICATIONS

Notice of Reasons for Refusal mailed on Oct. 19, 2021, received for JP Application 2021-164754, 8 pages including English Translation.

(Continued)

*Primary Examiner* — Hilina K Demeter
(74) *Attorney, Agent, or Firm* — XSENSUS LLP

(57) ABSTRACT

A portal, which is an object for an avatar to move between virtual reality spaces, can be installed with an information processing device. The installation processing device includes circuitry configured to receive an installation instruction of a portal, which is an object for an avatar to move from a first VR space to a second VR space, in the first VR space, the installation instruction specifying the first VR space and the second VR space; and perform, in response to the acceptance of the installation instruction, installation processing for installing the portal in the first VR space in one or more devices including another device other than a device that has accepted an input of the installation instruction.

15 Claims, 22 Drawing Sheets

(51) Int. Cl.
*G06T 19/20* (2011.01)
*G06V 10/74* (2022.01)

(56) References Cited

U.S. PATENT DOCUMENTS

| | | |
|---|---|---|
| 2008/0235320 A1 | 9/2008 | Joy et al. |
| 2012/0050257 A1* | 3/2012 | Clarke .................. G06F 16/972 |
| | | 707/769 |
| 2016/0086306 A1* | 3/2016 | Nishimaki ........... G02B 27/017 |
| | | 345/620 |
| 2017/0061696 A1 | 3/2017 | Li et al. |
| 2018/0091629 A1 | 3/2018 | de la Pena |
| 2018/0173404 A1 | 6/2018 | Smith |
| 2019/0051051 A1 | 2/2019 | Kaufman et al. |
| 2019/0111336 A1 | 4/2019 | Gutierrez et al. |
| 2019/0156576 A1 | 5/2019 | Ndolo |
| 2019/0250773 A1* | 8/2019 | Miyaki ................. A63F 13/212 |
| 2019/0371061 A1 | 12/2019 | Yang et al. |
| 2020/0020165 A1* | 1/2020 | Tran ......................... G06F 3/011 |
| 2020/0183567 A1* | 6/2020 | Gullicksen ............ G06F 3/0482 |
| 2020/0309557 A1* | 10/2020 | Efland .................... G06V 20/20 |
| 2021/0132771 A1* | 5/2021 | Shuster .................... A63F 13/63 |
| 2021/0356936 A1* | 11/2021 | Park ....................... B33Y 80/00 |
| 2021/0387087 A1* | 12/2021 | Liu .................... G06F 3/04815 |

FOREIGN PATENT DOCUMENTS

| | | |
|---|---|---|
| JP | 6556301 B1 | 8/2019 |
| JP | 2021-520573 A | 8/2021 |

OTHER PUBLICATIONS

Decision to Grant mailed on Nov. 16, 2021, received for JP Application 2021-164754, 5 pages including English Translation.

* cited by examiner

FIG. 9

| TERMINAL IDENTIFIER | WORLD IDENTIFIER | AVATAR IDENTIFIER | INSTALLATION CONDITION (INSTALLATION AUTHORITY) | DELETION CONDITION | CONFIRMATION CONDITION | MOVEMENT CONDITION |
|---|---|---|---|---|---|---|
| T01 | W01 | A01 | 1 | 2 OR LESS | 1 | CONTACT (DISTANCE=0) |
| T02 | W02 | A02 | 0 | — | 1 | DISTANCE <=1 |
| T03 | W02 | A03 | 1 | 1 AT MAXIMUM | 0 | CONTACT (DISTANCE=0) |
| T04 | W03 | A04 | 0 | — | 0 | −1 |
| ... | ... | ... | ... | ... | ... | ... |

FIG. 10
| WORLD IDENTIFIER | WORLD INFORMATION |
|---|---|
| W01 |  |
| W02 |  |
| ⋮ | ⋮ |

FIG. 11
| AVATAR IDENTIFIER | AVATAR INFORMATION |
|---|---|
| A01 | 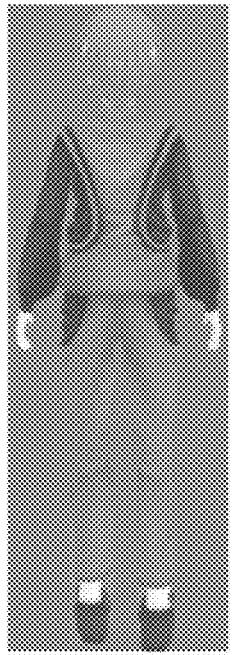 |
| A02 | 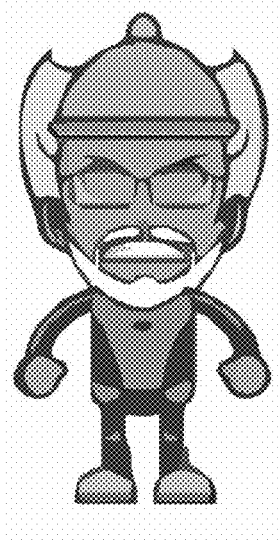 |
| ⋮ | ⋮ |

FIG. 12

| PORTAL IDENTIFIER | BIDIRECTIONAL FLAG | PORTAL ATTRIBUTE VALUE ||||||| DATE AND TIME | TERMINAL IDENTIFIER |
|---|---|---|---|---|---|---|---|---|---|
| | | FIRST IDENTIFIER | SECOND IDENTIFIER | FIRST INSTALLATION POSITION INFORMATION | SECOND INSTALLATION POSITION INFORMATION | FIRST MOVEMENT POSITION INFORMATION | SECOND MOVEMENT POSITION INFORMATION | PORTAL IMAGE | | |
| P01 | 0 | W01 | W04 | $(x_1, y_1, z_1)$ | — | — | $(X_1, Y_1, Z_1)$ | P01.jpg | 2021/9/20 16:30:15 | T01 |
| P02 | 1 | W01 | W03 | $(x_2, y_2, z_2)$ | $(x_3, y_3, z_3)$ | $(X_2, Y_2, Z_2)$ | $(X_3, Y_3, Z_3)$ | P02.jpg | 2021/9/21 10:11:27 | T01 |
| P03 | 0 | W02 | W03 | $(x_4, y_4, z_4)$ | — | — | $(X_4, Y_4, Z_4)$ | P01.jpg | 2021/9/21 11:27:50 | T03 |
| ... | ... | ... | ... | ... | ... | ... | ... | ... | ... | ... |

FIG. 13
| FILE NAME | PORTAL IMAGE ENTITY |
|---|---|
| P01.jpg | 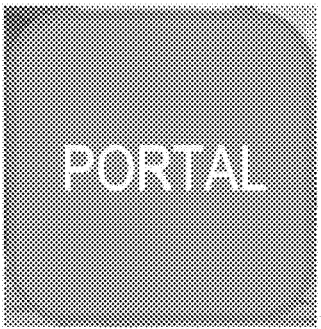 |
| P02.jpg | 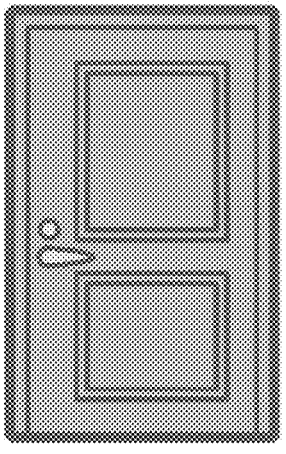 |
| ⋮ | ⋮ |

1301

1701

1901

AVATAR MOBILITY BETWEEN VIRTUAL REALITY SPACES

0. CROSS-REFERENCE TO RELATED APPLICATIONS

This patent application is a continuation of U.S. patent application Ser. No. 17/959,335, filed on Oct. 4, 2022, which claims priority pursuant to Japanese Patent Application No. 2021-164754, filed on Oct. 6, 2021, in the Japan Patent Office, the entire disclosure of each is hereby incorporated by reference herein.

1. TECHNICAL FIELD

The present disclosure relates to an information processing device and the like that output an avatar.

2. DESCRIPTION OF THE RELATED ART

Conventionally, there is a content distribution server capable of limiting an undesirable behavior of a viewer (see, for example, JP 6556301 B1).

The content distribution server includes: an information acquisition unit which acquires additional information for limiting a behavior of a viewer in distribution using a virtual character, which is added to the virtual character to be used by a distributor in a virtual space, and/or limit information for limiting the behavior of the viewer in the distribution using the virtual character, which is set by the distributor; a distribution unit which distributes a live content according to an image in the virtual space in which a movement of the distributor is synthesized as a movement of the virtual character; and a behavior limiting unit which limits the behavior of the viewer viewing the live content, on the basis of the additional information and/or the limit information set by the distributor, the behavior limiting unit limiting a manipulation of a virtual camera by the viewer for photographing an inside of the virtual space, on the basis of photographing limit information set by the distributor and/or photographing limit information to be included in the additional information.

SUMMARY

In the related art, however, it is difficult to install a portal which is an object for the avatar to move between virtual reality (VR) spaces. That is, the avatar is not easily movable between the VR spaces in the related art.

An information processing device as a first aspect of the present disclosure is an information processing device including: an installation instruction acceptance unit that accepts an installation instruction of a portal, which is an object for an avatar to move from a first VR space to a second VR space, in the first VR space, the installation instruction specifying the first VR space and the second VR space; and an installation processing unit that performs, in response to acceptance of the installation instruction, installation processing for installing the portal in the first VR space in one or more user terminals including another user terminal other than a user terminal that has accepted an input of the installation instruction.

Such a configuration makes it possible to install the portal which is the object for the avatar to move between the VR spaces. Therefore, the avatar can easily move between the VR spaces.

In addition, an information processing device as a second aspect of the present disclosure is the information processing device of the first aspect, in which the installation instruction includes first installation position information specifying the installation position of the portal in the first VR space and a second identifier specifying the second VR space.

With this configuration, an attribute value of the portal can be designated. Thus, for example, it is possible to arbitrarily set an installation position of the portal, a VR space as a movement destination, and the like, and it is possible to achieve VR experience with a higher degree of freedom for the user.

In addition, an information processing device as a third aspect of the present disclosure is the information processing device of the first or second aspect that further includes an installation determination unit that determines whether or not installation of the portal corresponding to the installation instruction satisfies an installation condition for installation of the portal, in which the installation processing unit performs the installation processing when the installation determination unit determines that the installation condition is satisfied.

With such a configuration, the portal can be installed when it is determined that the installation condition is satisfied. Thus, for example, it is possible to suppress unlimited creation of a portal that allows movement to a VR space in which only a specific user can originally participate, or the like.

In addition, an information processing device as a fourth aspect of the present disclosure is the information processing device of the third aspect, in which the installation condition is that a user corresponding to the installation instruction has installation authority, the installation determination unit determines whether or not the user corresponding to the installation instruction has the installation authority, and the installation processing unit performs the installation processing when the installation determination unit determines that the user has the installation authority.

With such a configuration, the portal can be installed when it is determined that an appropriate installation condition is satisfied. Thus, for example, only a specific user can install the portal, and as a result, it is possible to eliminate inconvenience such as unlimited installation of portals.

In addition, an information processing device as a fifth aspect of the present disclosure is the information processing device of any one of the first to fourth aspects that further includes: a movement determination unit that determines whether or not a movement condition for movement of the avatar based on the portal is satisfied; and a movement processing unit that performs movement processing which is processing of moving the avatar from the first VR space to the second VR space when the movement determination unit determines that the movement condition is satisfied.

With such a configuration, the avatar can move using the portal when it is determined that the movement condition is satisfied. Thus, the avatar can move using the portal when appropriate.

In addition, an information processing device as a sixth aspect of the present disclosure is the information processing device of the fifth aspect, in which the movement condition includes a distance condition based on a distance between the portal and the avatar, the movement determination unit determines whether or not the distance between the portal and the avatar is a distance that satisfies the distance condition, and the movement processing unit performs the movement processing when the movement determination unit determines that the distance condition is satisfied.

With such a configuration, the avatar can move using the portal when it is determined that an appropriate movement condition is satisfied. Thus, the user can suppress the avatar from unintentionally moving through the portal.

In addition, an information processing device as a seventh aspect of the present disclosure is the information processing device of the fifth or sixth aspect, in which the movement condition includes presence of a movement ticket corresponding to the avatar, and the movement processing is not performed when the movement determination unit determines that the movement ticket corresponding to the avatar is not present.

With such a configuration, the avatar can move using the portal when it is determined that an appropriate movement condition is satisfied.

In addition, an information processing device as an eighth aspect of the present disclosure is the information processing device of any one of the fifth to seventh aspects that further includes: a confirmation processing unit that performs confirmation processing for confirming whether or not to move from the first VR space to the second VR space, which correspond to the portal, when the avatar satisfies a predetermined confirmation condition; and a response acceptance unit that accepts a response corresponding to the confirmation processing, in which the movement processing unit performs movement processing which is processing of moving the avatar from the first VR space to the second VR space when the response accepted by the response acceptance unit is information indicating movement.

With such a configuration, the user can confirm whether or not to move when the avatar moves according to the present embodiment. Thus, the user can suppress the avatar from unintentionally moving through the portal.

In addition, an information processing device as a ninth aspect of the present disclosure is the information processing device of any one of the first to eighth aspects that further includes: a deletion determination unit that determines whether or not a deletion condition for deleting the portal is satisfied; and a deletion processing unit that performs deletion processing for deleting the portal for which the deletion determination unit has determined that the deletion condition is satisfied.

With this configuration, the portal can be automatically deleted. Thus, for example, only an appropriate portal can be left.

In addition, an information processing device as a tenth aspect of the present disclosure is the information processing device of the seventh aspect, in which the deletion condition is that one user has installed portals equal to or more than a threshold or more than the threshold, and the deletion processing unit deletes a portal installed by the user corresponding to the installation instruction accepted by the installation instruction acceptance unit, the portal being installed in the past.

With this configuration, the portal can be appropriately deleted. Thus, it is possible to reduce the possibility that a malicious user or the like installs a large number of portals to damage experience of other users in a VR space, and the like.

In addition, an information processing device as an eleventh aspect of the present disclosure is the information processing device of any one of the first to tenth aspects, in which the portal is the object that allows bidirectional movement including movement from the first VR space to the second VR space corresponding to the portal and movement from the second VR space to the first VR space.

With such a configuration, a bidirectional portal, which is an object for an avatar to move bidirectionally between two VR spaces, can be installed. Thus, the movement between VR spaces can be more easily performed since not only unidirectional movement but also bidirectional movement can be performed.

In addition, an information processing device as a twelfth aspect of the present disclosure is the information processing device of the eleventh aspect, in which the installation instruction has one or more pieces of position information of second installation position information specifying an installation position of the portal in the second VR space and first movement position information specifying an initial position in the first VR space when the avatar has moved to the first VR space based on the portal.

With this configuration, an attribute value of the bidirectional portal can be designated. Thus, for example, it is possible to arbitrarily set an installation position of the bidirectional portal, a VR space as a movement destination, and the like, and it is possible to easily achieve VR experience with a higher degree of freedom for the user.

In addition, an information processing device as a thirteenth aspect of the present disclosure is the information processing device of any one of the first to twelfth aspects that further includes: a portal storage unit that stores one or more pieces of portal information; and a terminal information storage unit that stores one or more pieces of terminal information related to the user terminals, in which the installation processing unit configures portal information corresponding to the installation instruction in response to the acceptance of the installation instruction, and performs portal registration processing of storing the portal information in the portal storage unit and portal arrangement processing of transmitting the portal information to the one or more user terminals respectively corresponding to the terminal information of the one or more pieces of terminal information stored in the terminal information storage unit.

With such a configuration, an installed portal can be reflected on another user terminal. Thus, it is possible to more easily move to an arbitrary VR space together with another user.

According to the information processing device of the present disclosure, it is possible to install the portal which is the object for the avatar to move between the VR spaces.

BRIEF DESCRIPTION OF THE DRAWINGS

FIG. 9 is a diagram illustrating a terminal information management table according to one or more aspects of the disclosed subject matter;

FIG. 10 is a diagram illustrating a world information management table according to one or more aspects of the disclosed subject matter;

FIG. 11 is a diagram illustrating an avatar information management table according to one or more aspects of the disclosed subject matter;

FIG. 12 is a diagram illustrating a portal information management table according to one or more aspects of the disclosed subject matter;

FIG. 13 is a view illustrating an example of a portal image according to one or more aspects of the disclosed subject matter;

DETAILED DESCRIPTION

Figure 1:
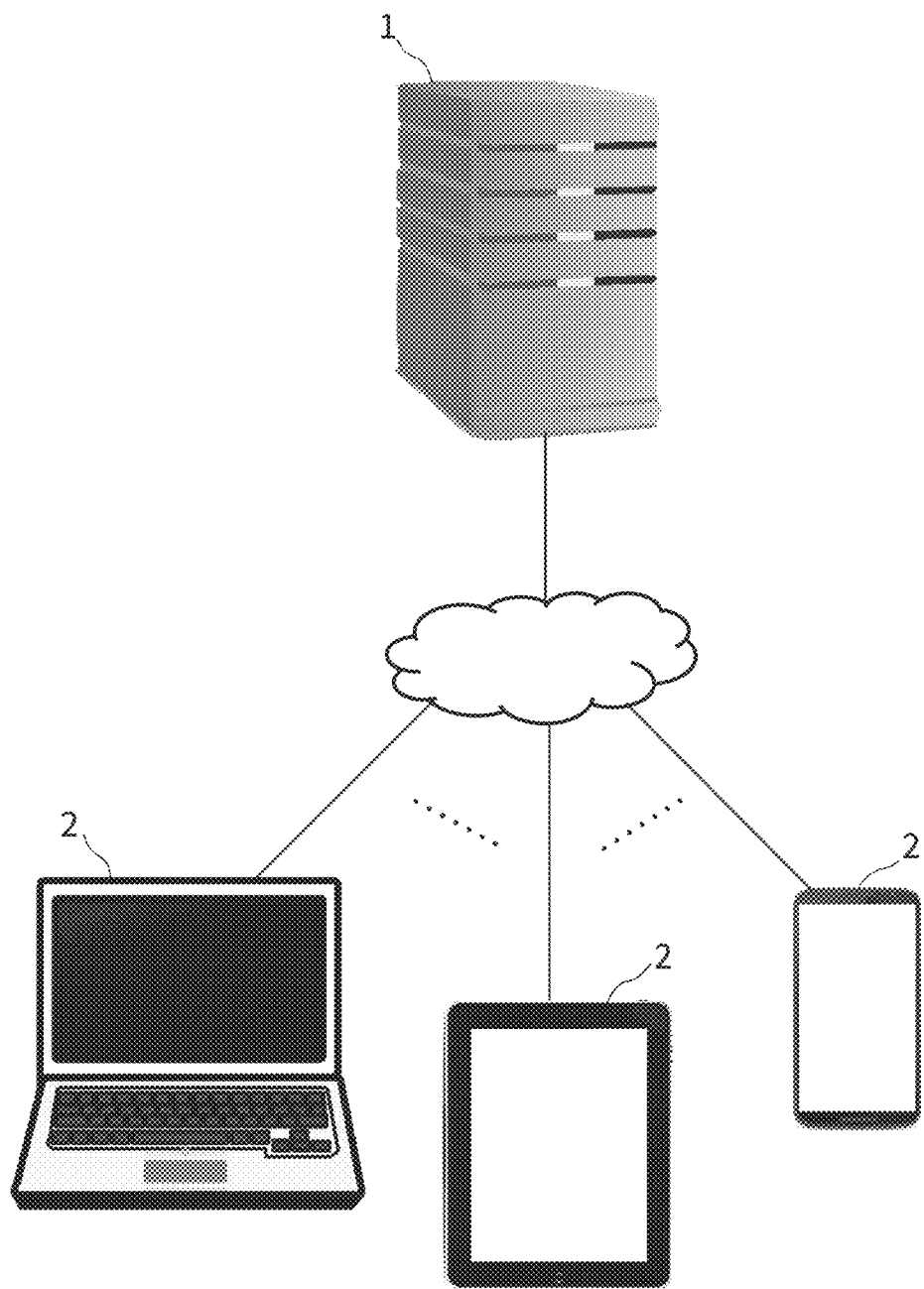
FIG. 1 is a conceptual diagram of an information system A according to one or more aspects of the disclosed subject matter.

Hereinafter, embodiments of an information processing device and the like will be described with reference to the drawings. Note that, components denoted by the same reference numerals in the embodiments similarly operate, and therefore, the redundant description thereof may be omitted.

In an exemplary embodiment, an information system including an information processing device capable of installing a portal in a VR space will be described.

In addition, the information processing device having a constraint in installation of a portal will be described in the present embodiment.

In addition, the information processing device having a constraint in a case where an avatar moves between VR spaces using the portal will be described in the present embodiment. Note that the constraint on the movement is, for example, a condition based on a distance between the avatar and the portal, or a condition based on a ticket for the movement of the avatar.

In addition, the information processing device that performs confirmation processing as to whether or not to move on the basis of a predetermined condition will be described in the present embodiment.

In addition, the information processing device that automatically deletes the portal when a deletion condition is satisfied will be described in the present embodiment.

In addition, the information processing device capable of installing the portal that enables a bidirectional movement between two VR spaces will be described in the present embodiment.

In addition, the information processing device that manages portal information and transmits the portal information to one or more user terminals 2 will be described in the present embodiment.

Note that the information system according to the present embodiment may be, for example, a system for supporting communication between users in a three-dimensional space in which two or more avatars that represent the respective users gather. Meanwhile, the information system is also applicable to games and the like. The information system only needs to have a function of outputting an avatar, and the application range thereof is not particularly limited.

FIG. 1 is a conceptual diagram of an information system A according to one or more aspects of the disclosed subject matter. The information system A includes an information processing device 1 and one or more user terminals 2.

The information processing device 1 is a server that receives an instruction from the user terminal 2 and transmits avatar information and portal information to the user terminal 2. The information processing device 1 is, for example, a cloud server, an Active Server Pages (ASP) server, or the like. Note that the type of the information processing device 1 is not particularly limited. In addition, the information processing device 1 may be a terminal as will be described later.

The user terminal 2 is a device that outputs an avatar or a portal. The user terminal 2 is, for example, a so-called personal computer, a tablet terminal, a smartphone, or the like, and the type thereof is not particularly limited.

The information processing device 1 can communicate with each of the one or more user terminals 2 through a communication line such as the Internet.

Figure 2:
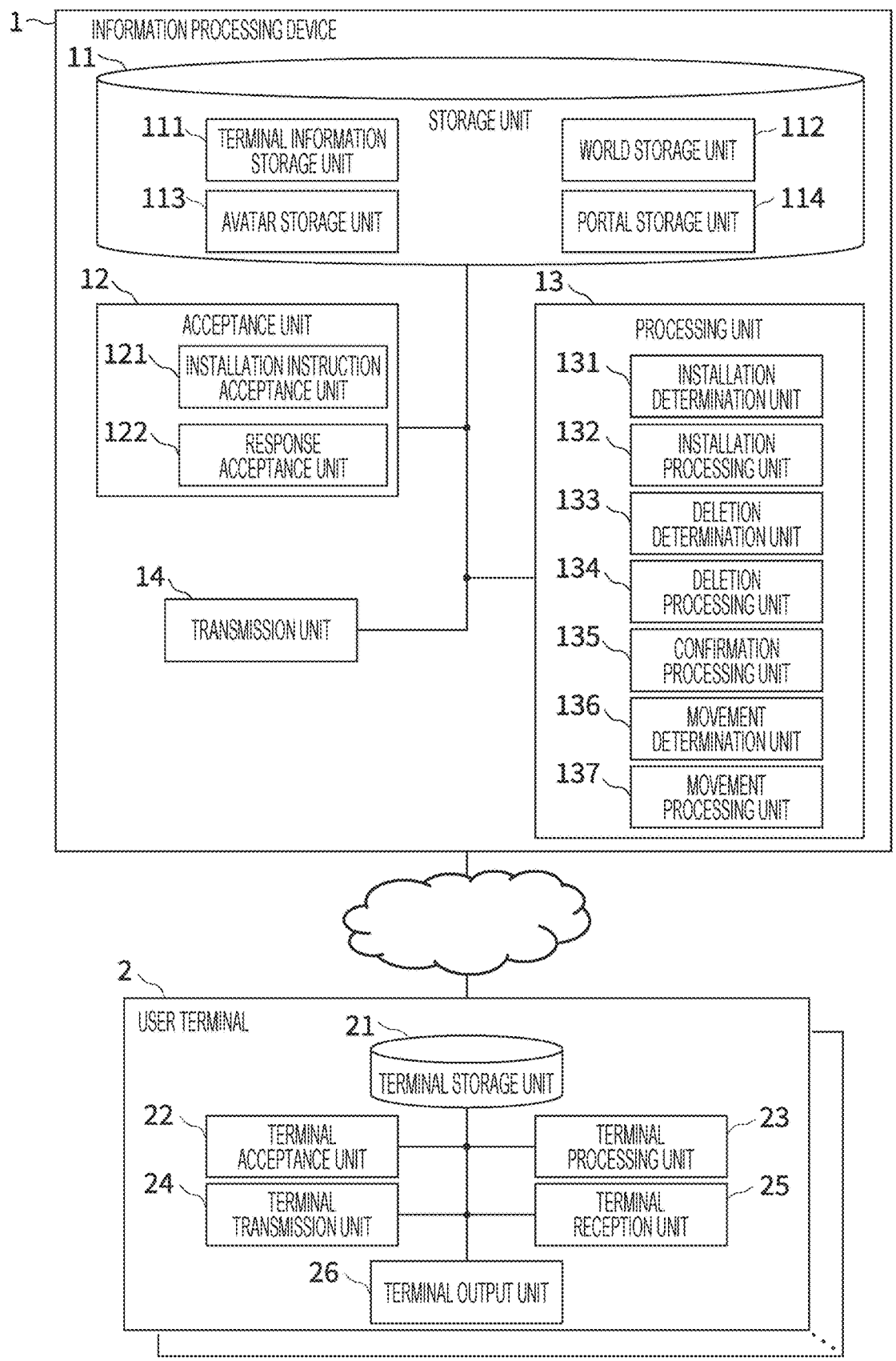
FIG. 2 is a block diagram of the information system A according to one or more aspects of the disclosed subject matter.

FIG. 2 is a block diagram of the information system A according to one or more aspects of the disclosed subject matter. The information processing device 1 includes a storage unit 11, an acceptance unit 12, a processing unit 13, and a transmission unit 14. The storage unit 11 includes a terminal information storage unit 111, a world storage unit 112, an avatar storage unit 113, and a portal storage unit 114. The acceptance unit 12 includes an installation instruction acceptance unit 121 and a response acceptance unit 122. The processing unit 13 includes an installation determination unit 131, an installation processing unit 132, a deletion determination unit 133, a deletion processing unit 134, a confirmation processing unit 135, a movement determination unit 136, and a movement processing unit 137.

The user terminal 2 includes a terminal storage unit 21, a terminal acceptance unit 22, a terminal processing unit 23, a terminal transmission unit 24, a terminal reception unit 25, and a terminal output unit 26.

The storage unit 11 constituting the information processing device 1 stores various types of information. The various types of information are, for example, terminal information to be described later, world information to be described later, avatar information to be described later, portal information to be described later, an installation condition to be described later, a deletion condition to be described later, a confirmation condition to be described later, a movement condition to be described later, and a movement ticket to be described later.

The terminal information storage unit 111 stores one or more pieces of terminal information. The terminal information is information related to the user terminal 2. The terminal information may be information related to a user who uses the user terminal 2. The terminal information may be information related to an avatar corresponding to the user who uses the user terminal 2. The terminal information includes, for example, a terminal identifier, a world identifier, and an avatar identifier. The terminal information may have, for example, the installation condition to be described later, the deletion condition to be described later, the confirmation condition to be described later, and the movement condition to be described later. That is, the installation condition, the deletion condition, the confirmation condition, and the movement condition may be different for each of the user terminals 2. Being different for each of the user terminals 2 means being different for each user or being different for each avatar. The terminal information has, for example, installation authority to be described later. In addition, the installation condition, the deletion condition, the confirmation condition, and the movement condition may be common to all the user terminals 2, all the users, and all the avatars.

The terminal identifier is information for identifying the user terminal 2. The terminal identifier is, for example, an ID, information (for example, an IP address or a telephone number) for communicating with the user terminal 2, a mail address, or a telephone number. The world identifier is information for identifying a world. The world identifier is, for example, an ID. The avatar identifier is information for identifying an avatar. The avatar identifier is, for example, an ID.

Note that the world identifier included in the terminal information is information for identifying a world that is being currently output on the corresponding user terminal 2. In addition, the avatar included in the terminal information is an avatar corresponding to a user who uses the corresponding user terminal 2. Note that the avatar may be referred to as a character. Needless to say, a shape, an outer shape, and the like of the avatar are not particularly limited.

The world storage unit 112 stores one or more pieces of world information. The world information is information for configuring a world. The structure of the world information is not particularly limited. The world is generally a virtual three-dimensional space. Note that the world may be referred to as a field. The world information is associated with, for example, a world identifier. Here, the world information is information configuring two or more VR spaces. The structure of the world information is not particularly limited.

The avatar storage unit 113 stores one or more pieces of avatar information. The avatar information includes information for configuring an avatar to be output. The avatar information is associated with, for example, an avatar identifier. Associating with the avatar identifier may mean having the avatar identifier. The avatar identifier is, for example, an ID of an avatar, but may be an ID of a user corresponding to the avatar, an ID of the user terminal 2 on which the avatar is to be displayed, or the like.

The avatar information generally includes model information. The avatar information preferably has avatar motion information that is information on a motion of the avatar.

The model information is information for configuring the display of the avatar. The model information includes, for example, mesh information, bone information, and material information. The model information has, for example, a data structure of glTF (GL Transmission Format). However, the data structure of the model information may be VRM, OBJ, FBX, STL, GLB, COLLADA, or the like, and may be of any type. The avatar information may include voice information and one or more attribute values in addition to the model information.

The avatar motion information is, for example, information specifying a motion when the avatar breathes. The avatar motion information is information of a fixed motion of the avatar.

The portal storage unit 114 stores one or more pieces of portal information. The portal information is information related to a portal. The portal is an object for the avatar to move between two VR spaces. The portal serves as a so-called virtual door. The portal is, for example, a unidirectional portal. The unidirectional portal is an object that allows an avatar to move from a first VR space to a second VR space, but does not allow the avatar to move from the second VR space to the first VR space. In a case where the portal is the unidirectional portal, the first VR space is a VR space as a movement source, and the second VR space is a VR space as a movement destination. Note that the portal may be the unidirectional portal or a bidirectional portal. The bidirectional portal is a portal through which an avatar is movable bidirectionally. Being movable bidirectionally means that being movable from the first VR space to the second VR space and being also movable from the second VR space to the first VR space.

The portal information is information associated with a portal identifier. The portal identifier is information for identifying a portal, and is, for example, an ID. The portal information is preferably associated with a terminal identifier of the user terminal 2 that has transmitted an installation instruction. Being associated with the terminal identifier may be being associated with a user identifier or being associated with an avatar identifier.

The portal information has one or more portal attribute values. The one or more portal attribute values are, for example, a first identifier specifying the first VR space, a second identifier specifying the second VR space, first installation position information, and second movement position information.

The first installation position information is information specifying an installation position of a portal in the first VR space. The first installation position information is, for example, a set of relative three-dimensional coordinates in the first VR space and eight three-dimensional coordinates for specifying a rectangular parallelepiped region in the first VR space.

The second movement position information is information specifying an initial position in the second VR space in a case where an avatar moves from the first VR space to the second VR space on the basis of a portal. The second movement position information is, for example, a set of relative three-dimensional coordinates in the second VR space and eight three-dimensional coordinates for specifying a rectangular parallelepiped region in the second VR space. Note that, in a case where portal information includes no first installation position information, a portal corresponding to this portal information is arranged at a default position in the first VR space. In addition, in a case where portal information includes no second movement position information and an avatar moves from the first VR space to the second VR space using a portal corresponding to this portal information, an initial position of an avatar after the movement is a default position in the second VR space.

In a case where the portal is the bidirectional portal, second installation position information and first movement position information may be included in one or more portal attribute values included in portal information. The second installation position information is information specifying an installation position of the portal in the second VR space. The first movement position information is information specifying an initial position in the first VR space in a case where an avatar moves from the second VR space to the first VR space on the basis of the portal. The first movement position information is, for example, a set of relative three-dimensional coordinates in the first VR space and eight three-dimensional coordinates for specifying a rectangular parallelepiped region in the first VR space.

Note that, in a case where the portal is the bidirectional portal and the portal information includes no second installation position information, the portal corresponding to this portal information is arranged at a default position in the second VR space. In addition, in a case where the portal is the bidirectional portal, the portal information includes no first movement position information, and an avatar has moved from the second VR space to the first VR space using the portal corresponding to this portal information, an initial position of the avatar after the movement is a default position in the first VR space.

In addition, in the case where the portal is the bidirectional portal, a position specified by the first movement position information and a position specified by the first installation position information may be the same. In addition, in the case where the portal is the bidirectional portal, a position specified by the second movement position information and a position specified by the second installation position information may be the same.

The acceptance unit 12 receives various types of instructions and information. The various types of instructions and information are, for example, installation instructions to be described later, responses to be described later, and operation information.

The operation information is information related to an operation of a user. The operation information is received from the user terminal 2, for example. The operation information is, for example, a command given to an avatar and position information indicating a position to which the avatar moves. The operation information may have any structure, content, and the like.

The acceptance unit 12 receives, for example, various types of instructions and information from the user terminal 2. That is, the acceptance here is the acceptance of information transmitted via the wired or wireless communication line, but may be a concept including acceptance of information input from an input device such as a keyboard, a mouse, or a touch panel, acceptance of information read from a recording medium such as an optical disk, a magnetic disk, or a semiconductor memory, and the like.

The installation instruction acceptance unit 121 accepts an installation instruction. The installation instruction acceptance unit 121 receives the installation instruction, for example, from the user terminal 2. For example, the installation instruction acceptance unit 121 may accept the installation instruction input by a user.

The installation instruction is an instruction to install a portal in a first VR space. Through the installation instruction, the first VR space in which the portal is to be installed and a second VR space as a movement destination are specified. The installation instruction of the unidirectional portal includes, for example, one or more pieces of information of a first identifier, a second identifier, first installation position information, and second movement position information. The installation instruction of the bidirectional portal includes, for example, one or more pieces of information of a first identifier, a second identifier, first installation position information, second installation position information, first movement position information, and second movement position information.

The response acceptance unit 122 accepts a response corresponding to confirmation processing. The response acceptance unit 122 receives the response, for example, from the user terminal 2.

The confirmation processing is processing for confirming whether or not an avatar moves. The confirmation processing is, for example, processing for confirming whether or not the avatar moves from a first VR space to a second VR space which correspond to a portal. In a case where the portal is a bidirectional portal, the confirmation processing is, for example, processing for confirming whether or not the avatar moves from the second VR space to the first VR space which correspond to the portal. The confirmation processing is, for example, processing of transmitting, to the user terminal 2, information, screen information, or the like for inquiring whether or not to move the avatar.

The response is information specifying whether or not to move. The response is, for example, a flag that can take any one of information indicating movement (for example, "1") and information indicating non-movement (for example, "0").

The processing unit 13 performs various types of processing. The various types of processing are, for example, processing performed by each of the installation determination unit 131, the installation processing unit 132, the deletion determination unit 133, the deletion processing unit 134, the confirmation processing unit 135, the movement determination unit 136, and the movement processing unit 137.

The installation determination unit 131 determines whether or not installation of a portal corresponding to an installation instruction satisfies the installation condition.

The installation condition is a condition for installing a portal. The installation condition is, for example, a condition related to an authority of a user and a condition related to the number of installed portals. The installation condition is, for example, that a user corresponding to an installation instruction has installation authority. The installation condition is, for example, that there is no portal for movement from a first VR space corresponding to an installation instruction to a second VR space corresponding to the installation instruction; that the number of portals installed by a particular user is equal to or less than a threshold or less than the threshold; that the number of portals that have been installed by a particular user in a particular world is equal to or less than a threshold or less than the threshold; that the number of portals for movement from a first VR space corresponding to an installation instruction to a second VR space corresponding to the installation instruction is equal to or less than a threshold or less than the threshold; or that the number of portals that have been already installed in a first VR space corresponding to an installation instruction is equal to or less than a threshold or less than the threshold.

Note that the installation authority paired with the user is installation authority possessed by terminal information corresponding to the user. The installation authority is information indicating presence of authority required in the case of installing a portal. That is, the installation determination unit 131 preferably determines whether the installation authority is stored in association with the terminal information of the user corresponding to the installation instruction. In addition, the installation authority may be authority to participate in a first VR space and a second VR space specified from identifiers included in the installation instruction. In a case where the user has the authority to participate in both the first VR space and the second VR space, it may be regarded that the user has the installation authority to the portal.

Note that the installation authority is generally stored in the storage unit 11, but may be stored in another device.

The installation processing unit 132 performs installation processing for installing a portal in a first VR space in one or more devices including a device receiving an input of an installation instruction and another device other than the device. The device receiving the input of the installation instruction is generally the user terminal 2. In addition, the another device is generally another user terminal 2. However, the device receiving the input of the installation instruction and the another device may be the information processing devices 1 suitable for information operating in a peer-to-peer (P2P) manner. The installation processing unit 132 performs the installation processing for installing a portal in a first VR space, for example, in one or more user terminals 2.

The installation processing is generally processing for installing a portal corresponding to an installation instruction. The installation processing includes, for example, portal registration processing and portal arrangement processing. Note that the installed portal may also use an avatar of a user other than a user who has installed the portal to move from a first VR space corresponding to the portal to a second VR space.

The portal registration processing is processing of configuring portal information corresponding to an installation instruction in response to acceptance of the installation instruction and storing the portal information in the portal storage unit 114.

The portal arrangement processing is processing of configuring portal information having a second identifier corresponding to an installation instruction in response to acceptance of the installation instruction, and transmitting the portal information to one or more user terminals 2. The one or more user terminals 2 generally include another user terminal 2 different from one user terminal 2 that has transmitted the installation instruction. The one or more user terminals 2 preferably include the one user terminal 2 that has transmitted the installation instruction.

The installation processing unit 132 performs the installation processing, for example, when the installation determination unit 131 determines that the installation condition is satisfied.

The installation processing unit 132 performs the installation processing, for example, when the installation determination unit 131 determines that installation authority corresponding to the one user terminal 2 that has transmitted the installation instruction is stored.

The deletion determination unit 133 determines whether or not a deletion condition is satisfied. For example, the deletion determination unit 133 determines whether or not the deletion condition is satisfied in response to acceptance of an installation instruction by the installation instruction acceptance unit 121. For example, the deletion determination unit 133 periodically determines whether or not the deletion condition is satisfied. That is, a trigger of the operation of the deletion determination unit 133 is not particularly limited.

The deletion condition is a condition for deleting a portal. The deletion condition is, for example, a condition related to the number of portals. The deletion condition is, for example, a condition related to use frequency.

The deletion condition related to the number of portals is, for example, that one user has installed portals equal to or more than a threshold or more than the threshold, or that there are portals equal to or more than a threshold or more than the threshold in a first VR space in which a portal has been installed.

The condition related to the use frequency is, for example, that the use frequency is low enough to satisfy the condition. The condition related to the use frequency is, for example, that movement of an avatar using a portal for a unit period is equal to or less than a threshold or less than the threshold. The condition regarding the use frequency is, for example, that movement of an avatar using a portal so far is equal to or less than a threshold or less than the threshold.

The deletion processing unit 134 performs the deletion processing for deleting a portal for which the deletion determination unit 133 has determined that the deletion condition is satisfied. The deletion processing is, for example, processing of deleting portal information from the portal storage unit 114. The deletion processing is, for example, transmitting a deletion instruction to each of one or more user terminals 2 in which the portal is installed. The deletion instruction includes, for example, information (for example, a portal identifier or the portal information itself) for specifying the portal information to be deleted.

The deletion processing unit 134 deletes, for example, a portal installed in the past, the portal installed by a user corresponding to an installation instruction received by the installation instruction acceptance unit 121.

In a case where an avatar satisfies a predetermined confirmation condition, the confirmation processing unit 135 performs confirmation processing corresponding to a portal. The confirmation condition is a condition for causing a user to confirm whether or not to move the avatar via the portal. Note that the confirmation condition may be the same as the movement condition to be described later.

The confirmation processing is processing for confirming whether or not to move from a first VR space to a second VR space which correspond to the portal. The confirmation processing may be, for example, processing for confirming whether or not to move from the second VR space to the first VR space which correspond to the portal. The confirmation processing is, for example, processing of transmitting screen information for confirmation to the user terminal 2.

The movement determination unit 136 determines whether or not the movement condition is satisfied. The movement condition is a condition for determining whether or not to move an avatar via a portal. The movement condition is, for example, a distance condition or a ticket condition.

The distance condition is a condition related to a distance between a portal and an avatar. The distance condition is, for example, that a distance between the portal and the avatar is equal to or less than a threshold or less than the threshold. In addition, the distance condition is, for example, that the avatar has come into contact with the portal (that is, the distance is zero).

The ticket condition is that an avatar has a movement ticket. The condition that the avatar has the movement ticket may be a condition that the user terminal 2 or a user corresponding to the avatar has the movement ticket. The condition that the avatar has the movement ticket means that, for example, terminal information corresponding to the user terminal 2 has the movement ticket. Note that the movement ticket is information required for movement from a first VR space to a second VR space. The movement ticket has, for example, a second identifier for identifying the second VR space as a movement destination. The movement ticket has, for example, a second identifier for identifying a first VR space as a movement source. The movement ticket includes, for example, number-of-times information specifying the number of times movement is possible. In a case where the movement ticket has the number-of-times information, the number-of-times information in the movement ticket decreases every movement, and the movement ticket is no longer usable when the number-of-times information becomes zero.

For example, the movement determination unit 136 determines whether or not a distance between a portal and an avatar is small enough to satisfy the distance condition.

The movement processing unit 137 performs movement processing using a portal. The movement processing is processing of moving an avatar to a second VR space corresponding to the portal. In the movement processing, for example, second movement position information specifying an initial position in the second VR space corresponding to the portal is set as position information of the avatar. Then, the movement processing unit 137 transmits a movement instruction including an avatar identifier for identifying the avatar, a second identifier, and the second movement position information to each of one or more user terminals 2 such that the position of the avatar is change to a position indicated by the second movement position information in the second VR space, for example. Note that the movement instruction is an instruction to move the avatar.

The movement processing unit 137 performs the movement processing when the movement determination unit 136 determines that the movement condition is satisfied.

The movement processing unit 137 does not perform the movement processing when the movement determination unit 136 determines that the distance condition is not satisfied.

In a case where a response accepted by the response acceptance unit 122 is information indicating movement, the movement processing unit 137 performs the movement processing that is processing of moving an avatar from a first VR space to a second VR space. On the other hand, in a case where the response accepted by the response acceptance unit 122 is information indicating non-movement, the movement processing unit 137 does not perform the movement processing.

The transmission unit 14 transmits various instructions and information to one or more user terminals 2. The various instructions and information are, for example, world information, avatar information, and portal information.

The terminal storage unit 21 constituting the user terminal 2 stores various types of information. The various types of information are, for example, world information, avatar information, and portal information. The various types of information are generally information received from the information processing device 1. However, the world information and the like may be information received from another user terminal 2 or a device (not illustrated).

The terminal acceptance unit 22 accepts various types of information, instructions, and operations. Note that the instruction may be considered to include an operation. In addition, the various types of information, instructions, and operations are, for example, an output instruction, an installation instruction, and a response. The output instruction is an instruction to output a virtual three-dimensional image including an avatar. The output instruction has, for example, an avatar identifier for identifying the avatar to be used, and a world identifier for identifying a world to be used.

Here, the acceptance is generally acceptance of information input from input means, but may be a concept including, for example, acceptance of information transmitted via a wired or wireless communication line, and acceptance of information read from a recording medium such as an optical disk, a magnetic disk, or a semiconductor memory. Note that the input means may be, for example, various input means for VR and games, a mouse, a keyboard, a cross key, or the like. The input means for VR or games are, for example, a hand controller and the PHANTOM.

The terminal processing unit 23 performs various types of processing. In the various types of processing, for example, one or more pieces of information among world information, avatar information, and portal information are used to configure an image to be output. Such an image is generally a virtual three-dimensional image and has an avatar. Such an image generally has one or more VR spaces. Such an image preferably has a portal. Such an image preferably has a world. In addition, the image is generally a moving image having a motion corresponding to an operation accepted by the terminal acceptance unit 22. The various types of processing are, for example, processing of operating an avatar on the basis of the operation accepted by the terminal acceptance unit 22. In the various types of processing, for example, a screen is configured using received screen information.

The terminal processing unit 23 configures operation information in accordance with an operation accepted by the terminal acceptance unit 22 from a user. The terminal processing unit 23 configures an image having an avatar, a world, or the like that changes in accordance with the operation accepted by the terminal acceptance unit 22 from the user.

The terminal processing unit 23 configures an instruction or information to be transmitted, for example, using an instruction or information accepted by the terminal acceptance unit 22.

The terminal transmission unit 24 transmits various instructions and information to the information processing device 1. The various instructions and information are, for example, an output instruction, an installation instruction, a response, and operation information.

The terminal reception unit 25 receives various instructions and information from the information processing device 1. The various instructions and information are, for example, world information, avatar information, portal information, screen information, and a confirmation instruction.

The terminal output unit 26 outputs various types of information. The various types of information are, for example, an image configured by the terminal processing unit 23 and a screen for receiving an input of a response.

Here, the output is generally display on a display and projection using a projector, but may be a concept including, for example, storage in a recording medium, and delivery of a processing result to another processing device, another program, or the like.

The storage unit 11, the terminal information storage unit 111, the world storage unit 112, the avatar storage unit 113, the portal storage unit 114, and the terminal storage unit 21 are preferably volatile recording media, but can also be achieved by non-volatile recording media. The process of storing information in the storage unit 11 or the like is not particularly limited. For example, information may be stored in the storage unit 11 or the like via a recording medium, information transmitted via a communication line or the like may be stored in the storage unit 11 or the like, or information input via an input device may be stored in the storage unit 11 or the like.

The acceptance unit 12, the installation instruction acceptance unit 121, the response acceptance unit 122, and the terminal reception unit 25 are generally achieved by wireless or wired communication means, but may be achieved by means for receiving broadcast.

The processing unit 13, the installation determination unit 131, the installation processing unit 132, the deletion determination unit 133, the deletion processing unit 134, the confirmation processing unit 135, the movement determination unit 136, the movement processing unit 137, and the terminal processing unit 23 can be generally achieved by a processor, a memory, and the like. The procedure of the processing performed by the processing unit 13 and the like is generally achieved by software, and the software is recorded in a recording medium such as a read-only memory (ROM). However, it may be achieved by hardware (dedicated circuit). Note that the processor is a central processing unit (CPU), a micro-processing unit (MPU), a graphics processing unit (GPU), or the like, and the type of the processing unit is not particularly limited. Further, processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The transmission unit 14 and the terminal transmission unit 24 are generally achieved by wireless or wired communication means, but may be achieved by broadcasting means.

The terminal acceptance unit 22 can be achieved by a device driver of input means such as a touch panel or a keyboard, control software of a menu screen, or the like.

The terminal output unit 26 may be considered to include or not include an output device such as a display. The terminal output unit 26 can be achieved by driver software of an output device, or driver software of an output device and the output device together.

Next, an operation example of the information system A will be described. First, an operation example of the information processing device 1 will be described with reference to a flowchart of FIG. 3.

(Step S301) The acceptance unit 12 determines whether or not an output instruction has been received from the user terminal 2. The process proceeds to step S302 when the output instruction has been received, and proceeds to step S304 when the output instruction has not been received.

(Step S302) The processing unit 13 acquires world information, which corresponds to the user terminal 2 that has transmitted the output instruction, from the world storage unit 112. The processing unit 13 acquires avatar information corresponding to the user terminal 2 from the avatar storage unit 113. The processing unit 13 acquires one or more pieces of portal information corresponding to the user terminal 2 from the portal storage unit 114.

Note that the processing unit 13 may acquire world information, identified by a world identifier included in the output instruction, from the world storage unit 112, acquire portal information of a portal in the corresponding world from the portal storage unit 114, and acquire avatar information, identified by an avatar identifier included in the output instruction, from the avatar storage unit 113.

Here, the processing unit 13 may use the acquired world information, avatar information, and one or more pieces of portal information to configure an output image to be output by the user terminal 2 that has transmitted the output instruction.

(Step S303) The transmission unit 14 transmits the world information, the avatar information, and the one or more pieces of portal information, which have been acquired in step S302, to the user terminal 2 that has transmitted the output instruction. The process returns to step S301.

In a case where the output image is configured in step S302, the transmission unit 14 transmits the output image to the user terminal 2.

(Step S304) The installation instruction acceptance unit 121 determines whether or not an installation instruction has been received from the user terminal 2. The process proceeds to step S305 when the installation instruction has been received, and proceeds to step S308 when the installation instruction has not been received.

(Step S305) The processing unit 13 performs portal installation processing. An example of the installation processing will be described with reference to a flowchart of FIG. 4.

(Step S306) In step S305, the deletion determination unit 133 determines whether or not a portal has been installed. The process proceeds to step S307 when the portal has been installed, and returns to step S301 when the portal has not been installed.

(Step S307) The processing unit 13 performs portal deletion processing. An example of the deletion processing will be described with reference to a flowchart of FIG. 5. The process returns to step S301. Here, the portal deletion is not necessarily performed.

(Step S308) The acceptance unit 12 determines whether or not operation information has been received from the user terminal 2. The process proceeds to step S309 when the operation information has been received, and returns to step S301 when the operation information has not been received.

(Step S309) The movement determination unit 136 determines whether or not a movement condition is satisfied using the operation information received in step S308. The process proceeds to step S310 when the movement condition is satisfied, and proceeds to step S316 when the movement condition is not satisfied.

(Step S310) The confirmation processing unit 135 determines whether or not to confirm whether to perform the movement processing. The process proceeds to step S311 when the confirmation is to be performed, and proceeds to step S314 when the confirmation is not to be performed.

Note that the confirmation processing unit 135 may determine to constantly confirm whether to perform the movement processing, may determine not to constantly confirm whether to perform the movement processing, may determine whether or not to perform confirmation using a common confirmation condition, or may determine whether to perform confirmation by referring to a confirmation condition stored in association with avatar information or terminal information.

(Step S311) The confirmation processing unit 135 acquires screen information for the confirmation from the storage unit 11, and transmits the screen information to the user terminal 2 that has transmitted the installation instruction.

(Step S312) The response acceptance unit 122 determines whether or not a response has been received from the user terminal 2. The process proceeds to step S313 when the response has been received, and returns to step S312 when the response has not been received.

(Step S313) The process proceeds to step S314 when the response that has been received in step S312 is a response of "move", and proceeds to step S316 when the response is a response of "not move".

(Step S314) The movement processing unit 137 acquires a second identifier and second movement position information, included in portal information corresponding to the operation information received in step S308, from the portal storage unit 114.

(Step S315) The movement processing unit 137 performs processing of moving an avatar corresponding to the operation information received in step S308 to a position specified by the second movement position information in a second VR space identified by the second identifier acquired in step S314. The process returns to step S301.

Note that the processing of moving the avatar is, for example, processing of transmitting an avatar identifier, the second identifier, and the second movement position information of the avatar to be moved to one or more user terminals 2. In addition, the processing of moving the avatar is, for example, processing of rewriting a world identifier for specifying a world in which the avatar exists as the second identifier.

(Step S316) The processing unit 13 acquires information corresponding to the operation information received in step S308. The information corresponding to the operation information is, for example, information for moving an avatar, and is, for example, an avatar identifier and position information of the avatar after movement. The information corresponding to the operation information is, for example, information for creating a motion of an avatar, and is, for example, an avatar identifier and action information for creating the motion. However, the information corresponding to the operation information may have various types, and is not particularly limited.

(Step S317) The processing unit 13 transmits the information acquired in step S316 to one or more user terminals 2. The process returns to step S301. Note that a process of causing another user terminal 2 to perform a motion of an avatar by using operation information corresponding to an operation on the avatar performed on one user terminal 2 is a publicly known technique, and thus a detailed description thereof will be omitted.

Figure 3:
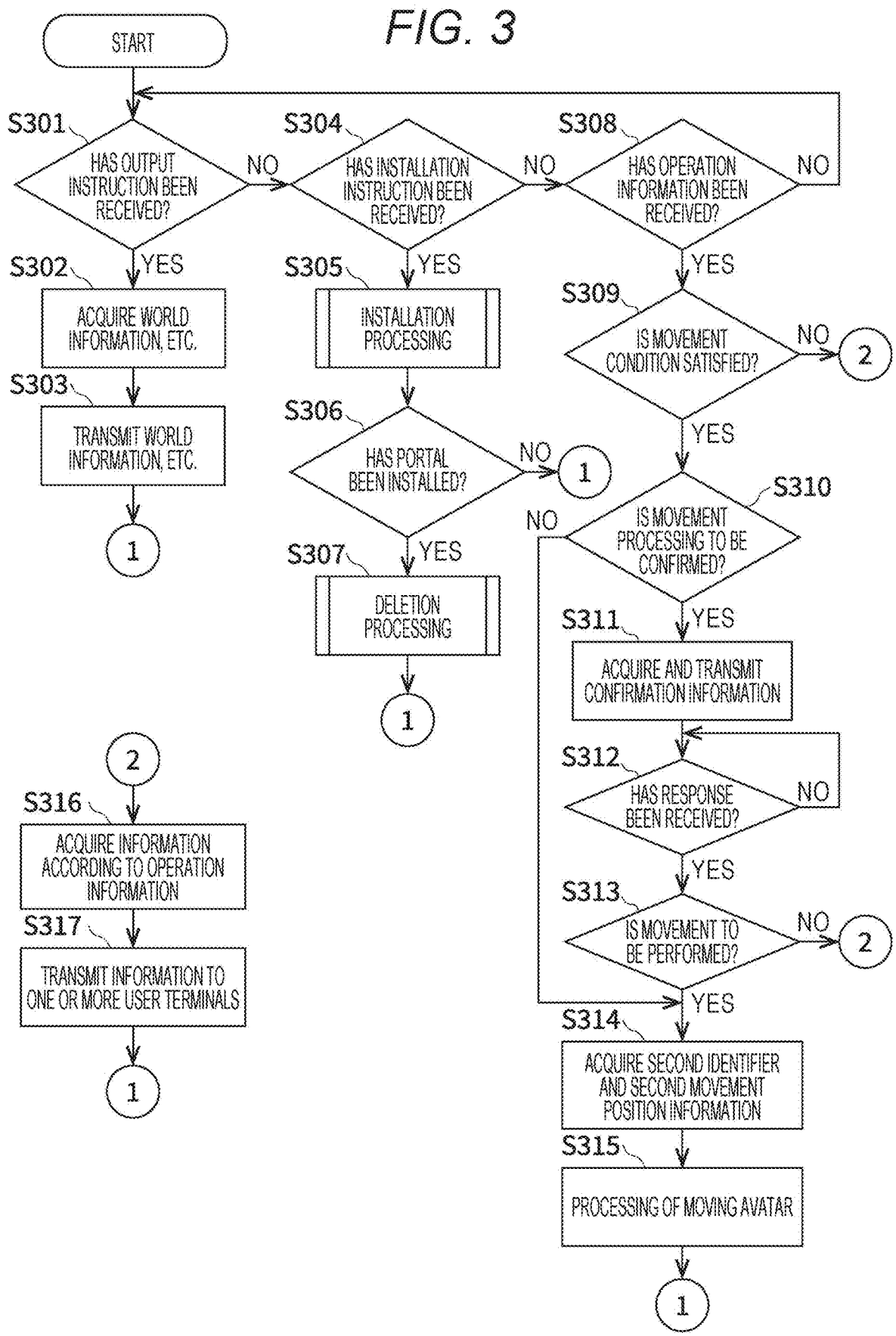
FIG. 3 is a flowchart for describing an operation example of an information processing device according to one or more aspects of the disclosed subject matter.

Note that the deletion processing is performed after the installation processing in the flowchart of FIG. 3. However, the trigger of the deletion processing is not particularly limited.

Note that the process ends due to power-off and/or an interruption ending the process in the flowchart of FIG. 3.

Figure 4:
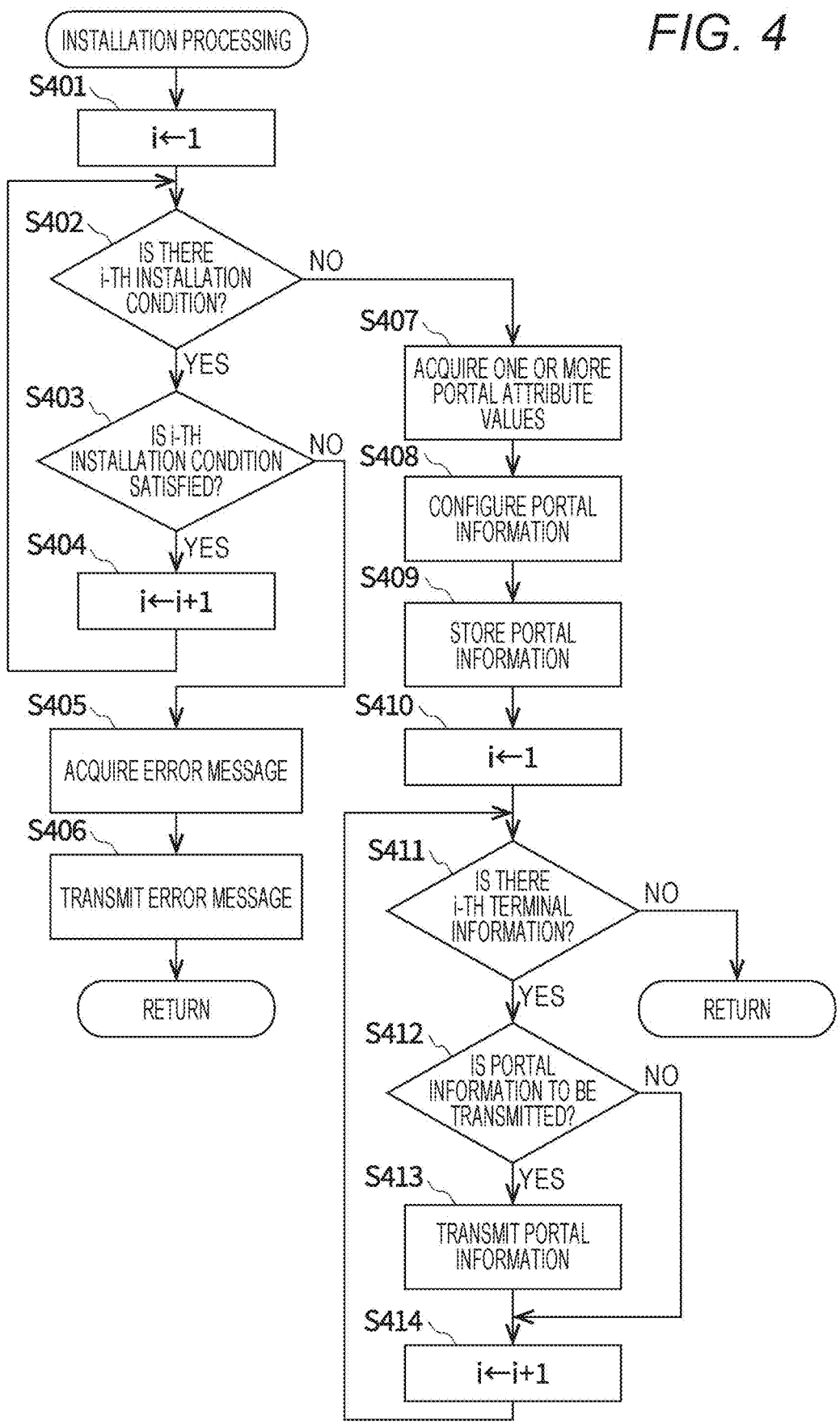
FIG. 4 is a flowchart for describing an example of installation processing according to one or more aspects of the disclosed subject matter.

Next, an example of the installation processing in step S305 will be described with reference to the flowchart of FIG. 4.

(Step S401) The installation determination unit 131 substitutes 1 into a counter i.

(Step S402) The installation determination unit 131 determines whether or not there is an i-th installation condition in the storage unit 11. The process proceeds to step S403 when there is the i-th installation condition, and proceeds to step S405 when there is no i-th installation condition.

(Step S403) The installation determination unit 131 determines whether or not the i-th installation condition is satisfied. The process proceeds to step S404 when the i-th installation condition is satisfied, and proceeds to step S405 when the i-th installation condition is not satisfied.

(Step S404) The installation determination unit 131 increments the counter i by 1. The process returns to step S402.

(Step S405) The installation processing unit 132 acquires an error message from the storage unit 11.

(Step S406) The installation processing unit 132 transmits the error message acquired in step S405 to the user terminal 2 that has transmitted the installation instruction.

(Step S407) The installation processing unit 132 acquires one or more portal attribute values corresponding to the installation instruction. The one or more portal attribute values corresponding to the installation instruction are, for example, a portal attribute value included in the installation instruction and a default portal attribute value.

(Step S408) The installation processing unit 132 configures portal information using the one or more portal attribute values acquired in step S407. For example, the installation processing unit 132 acquires a unique portal identifier, and configures the portal information using the portal identifier and the one or more portal attribute values acquired in step S407.

(Step S409) The installation processing unit 132 stores the portal information configured in step S408 in the portal storage unit 114.

(Step S410) The installation processing unit 132 substitutes 1 into the counter i.

(Step S411) The installation processing unit 132 determines whether or not there is i-th terminal information in the terminal information storage unit 111. The process proceeds to step S412 when there is the i-th terminal information, and returns to the upper routine when there is no i-th terminal information.

(Step S412) The installation processing unit 132 determines whether or not to transmit the portal information configured in step S408 to the user terminal 2 corresponding to the i-th terminal information. The process proceeds to step S413 when the portal information is to be transmitted, and proceeds to step S414 when the portal information is not to be transmitted.

Note that the installation processing unit 132 determines to transmit the portal information, for example, in a case where the i-th terminal information has a movement ticket that allows use of a portal. In addition, the installation processing unit 132 determines to transmit the portal information, for example, in a case where a world identifier included in the portal information coincides with a world identifier for identifying a world in which an avatar corresponding to the i-th terminal information exists. Note that a condition for determining the user terminal 2 to which the portal information is to be transmitted is not particularly limited.

(Step S413) The installation processing unit 132 transmits the portal information configured in step S408 to the user terminal 2 corresponding to the i-th terminal information.

(Step S414) The installation processing unit 132 increments the counter i by 1. The process returns to step S411.

Figure 5:
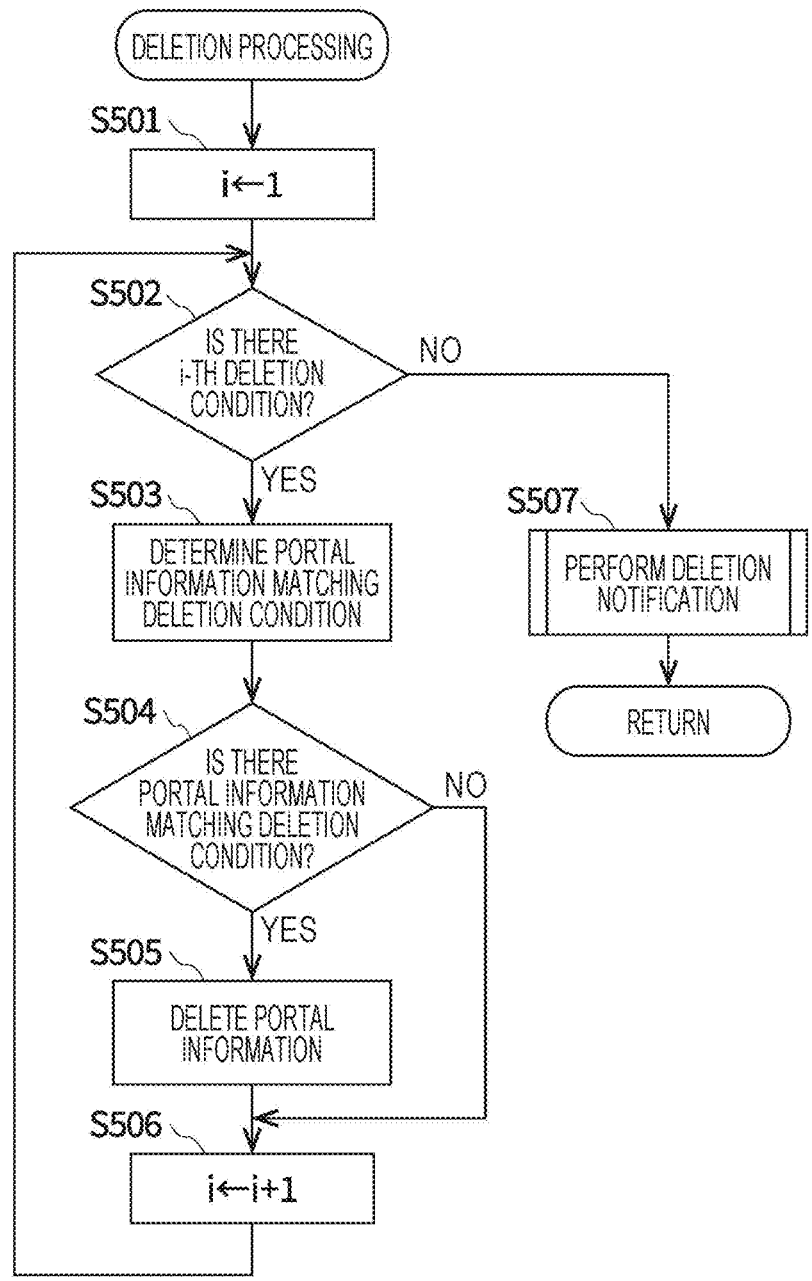
FIG. 5 is a flowchart for describing an example of deletion processing according to one or more aspects of the disclosed subject matter.

Next, an example of the deletion processing in step S307 will be described with reference to the flowchart of FIG. 5.

(Step S501) The deletion determination unit 133 substitutes 1 into the counter i.

(Step S502) The deletion determination unit 133 determines whether or not there is an i-th deletion condition in the storage unit 11. The process proceeds to step S503 when there is the i-th deletion condition, and proceeds to step S507 when there is no i-th deletion condition.

(Step S503) The deletion determination unit 133 refers to the portal storage unit 114 and determines portal information matching the i-th deletion condition.

(Step S504) In step S503, the deletion processing unit 134 determines whether or not there are one or more pieces of portal information determined to be deleted. The process proceeds to step S505 when there is the portal information to be deleted, and proceeds to step S506 when there is no portal information to be deleted.

(Step S505) The deletion processing unit 134 deletes the one or more pieces of portal information determined in step S503 from the portal storage unit 114.

(Step S506) The deletion determination unit 133 increments the counter i by 1. The process returns to step S502.

(Step S507) The deletion processing unit 134 performs deletion notification processing. The process returns to the upper routine. Note that the deletion notification processing is processing of notifying the user terminal 2 of the portal information to be deleted. An example of the deletion notification processing will be described with reference to a flowchart of FIG. 6.

Figure 6:
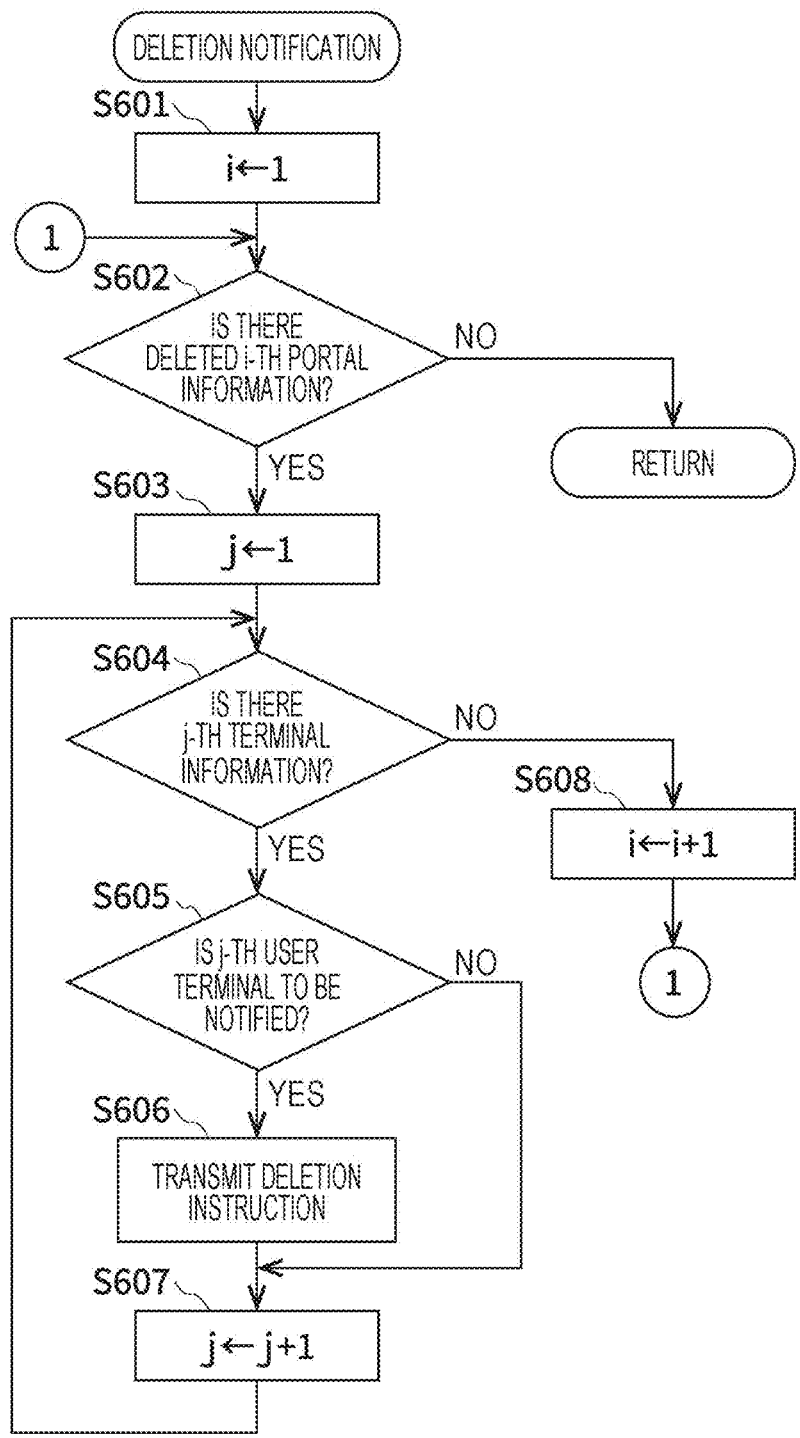
FIG. 6 is a flowchart for describing an example of deletion notification processing according to one or more aspects of the disclosed subject matter.

Next, an example of the deletion notification processing in step S507 will be described with reference to the flowchart in FIG. 6.

(Step S601) The deletion processing unit 134 substitutes 1 into the counter i.

(Step S602) The deletion processing unit 134 determines whether or not there is i-th portal information that has been deleted. The process proceeds to step S603 when there is the deleted i-th deleted portal information, and returns to the upper routine when there is no deleted i-th portal information.

(Step S603) The deletion determination unit 133 substitutes 1 into a counter j.

(Step S604) The deletion processing unit 134 determines whether or not there is j-th terminal information in the terminal information storage unit 111. The process proceeds to step S605 when there is the j-th terminal information, and proceeds to step S608 when there is no j-th terminal information.

(Step S605) The deletion processing unit 134 uses the j-th terminal information to determine whether or not to notify the user terminal 2 corresponding to the j-th terminal information of deletion of the i-th portal information. The process proceeds to step S606 when the notification of the deletion is to be made, and proceeds to step S607 when the notification of the deletion is not to be made. Note that the deletion processing unit 134 generally determines to notify the user terminal 2 transmitting the i-th portal information of the deletion.

(Step S606) The deletion processing unit 134 transmits a portal deletion instruction including information specifying the i-th portal information (for example, a portal identifier or portal information) to the user terminal 2 corresponding to the j-th terminal information.

(Step S607) The deletion determination unit 133 increments the counter j by 1. The process returns to step S604.

(Step S608) The deletion determination unit 133 increments the counter i by 1. The process returns to step S602.

Next, an operation example of the user terminal 2 will be described with reference to flowcharts of FIGS. 7 and 8.

(Step S701) The terminal acceptance unit 22 determines whether or not an output instruction has been accepted. The process proceeds to step S702 when the output instruction has been accepted, and proceeds to step S707 when the output instruction has not been accepted. Note that the output instruction includes, for example, a world identifier and an avatar identifier.

(Step S702) The terminal processing unit 23 acquires a terminal identifier of the terminal storage unit 21, and configures an output instruction having the terminal identifier. The terminal transmission unit 24 transmits the output instruction to the information processing device 1.

(Step S703) The terminal reception unit 25 determines whether or not world information or the like or an output image has been received from the information processing device 1 in response to the transmission of the output instruction. The process proceeds to step S704 when the world information or the like or the output image has been received, and returns to step S703 when the world information or the like or the output image has not been received. Note that the world information or the like generally includes the world information, avatar information, and one or more pieces of portal information.

(Step S704) The terminal processing unit 23 temporarily stores the world information or the like or the output image, received in step S703, in the terminal storage unit 21.

(Step S705) The terminal processing unit 23 configures an output image using the world information or the like received in step S703, or acquires the output image received in step S703.

(Step S706) The terminal output unit 26 outputs the output image acquired in step S705. The process returns to step S701.

(Step S707) The terminal acceptance unit 22 determines whether or not an installation instruction has been accepted. The process proceeds to step S708 when the installation instruction has been accepted, and proceeds to step S713 when the installation instruction has not been accepted. Note that the installation instruction has, for example, one or more portal attribute values.

(Step S708) The terminal processing unit 23 uses the installation instruction received in step S707 to configure an installation instruction to be transmitted. Next, the terminal transmission unit 24 transmits the installation instruction to the information processing device 1.

Note that the terminal processing unit 23 acquires, for example, a terminal identifier of the terminal storage unit 21, and configures an installation instruction including the terminal identifier and the one or more portal attribute values included in the installation instruction accepted in step S707.

(Step S709) The terminal reception unit 25 determines whether or not information has been received from the information processing device 1 in response to the transmission of the installation instruction in step S708. When the information has been received, the process proceeds to step S710, and when the information has not been received, the process returns to step S709.

(Step S710) The terminal processing unit 23 determines whether or not the information received in step S709 is portal information. The process proceeds to step S711 in the case of the portal information, and proceeds to step S712 in the case of an error message.

(Step S711) The terminal processing unit 23 stores the portal information received in step S709 in the terminal storage unit 21. In addition, the terminal processing unit 23 uses the portal information received in step S709 to configure a portal to be output. The terminal output unit 26 outputs the portal into a world. The process returns to step S701.

(Step S712) The terminal output unit 26 outputs the error message received in step S709. The process returns to step S701.

(Step S713) The terminal acceptance unit 22 determines whether or not an operation from a user has been accepted. The process proceeds to step S714 when the operation has been accepted, and proceeds to step S717 when the operation has not been accepted.

(Step S714) The terminal processing unit 23 configures information to be changed in accordance with the operation in step S713. The terminal output unit 26 outputs the configured information. Note that the information to be changed is, for example, information of an avatar whose posture has been changed, information of an avatar whose position has been changed, or the like.

(Step S715) The terminal processing unit 23 configures operation information in accordance with the operation in step S713. Note that the terminal processing unit 23 generally acquires a terminal identifier of the terminal storage unit 21 and configures operation information associated with the terminal identifier.

(Step S716) The terminal transmission unit 24 transmits the operation information associated with the terminal identifier to the information processing device 1. The process returns to step S701. Step S717 and the subsequent steps are illustrated in FIG. 8.

(Step S717) The terminal reception unit 25 determines whether or not confirmation information has been received from the information processing device 1. The process proceeds to step S718 when the confirmation information has been received, and proceeds to step S723 when the confirmation information has not been received.

(Step S718) The terminal processing unit 23 configures confirmation information to be output. The terminal output unit 26 outputs the confirmation information.

(Step S719) The terminal acceptance unit 22 determines whether or not a response from the user has been accepted. The process proceeds to step S720 when the response has been accepted, and returns to step S719 when the response has not been accepted.

(Step S720) The terminal processing unit 23 uses the response accepted in step S719 to configure a response to be transmitted. Note that the terminal processing unit 23 acquires, for example, a portal identifier or a terminal identifier corresponding to the confirmation information, and configures a response associated with the portal identifier or the terminal identifier. The terminal transmission unit 24 transmits the response associated with the portal identifier or the terminal identifier to the information processing device 1.

(Step S721) The terminal processing unit 23 determines whether or not the response accepted in step S719 is a response of "move". The process proceeds to step S722 in the case of the response of "move", and returns to step S701 in the case of a response of "not move".

(Step S722) The terminal processing unit 23 performs processing of moving an avatar to a position specified by second position information in a second VR space identified by a second identifier corresponding to a portal corresponding to the confirmation information. The process returns to step S701. Note that an output in which the avatar corresponding to the user terminal 2 moves from a current position in a first VR space to the position specified by the second position information in the second VR space can be obtained by the processing of moving the avatar.

(Step S723) The terminal reception unit 25 determines whether or not portal information has been received. The process proceeds to step S724 when the portal information has been received, and proceeds to step S726 when the portal information has not been received.

(Step S724) The terminal processing unit 23 stores the portal information received in step S723 in the terminal storage unit 21.

(Step S725) the terminal processing unit 23 uses the portal information received in step S723 to configure a portal to be output. The terminal output unit 26 outputs the portal onto a VR space. The process returns to step S701.

(Step S726) The terminal reception unit 25 determines whether or not a portal deletion instruction has been received. The process proceeds to step S727 when the deletion instruction has been received, and proceeds to step S728 when the deletion instruction has not been received.

(Step S727) The terminal processing unit 23 deletes portal information, which corresponds to the deletion instruction received in step S726, from the terminal storage unit 21. In addition, the terminal processing unit 23 configures an output image that hides a portal corresponding to the deletion instruction not to be displayed. Then, the terminal output unit 26 hides the portal not to be displayed. The process returns to step S701.

(Step S728) The terminal reception unit 25 determines whether or not information on another avatar has been received. The process proceeds to step S729 when the information on the another avatar has been received, and returns to step S701 when the information on the another avatar has not been received.

(Step S729) The terminal processing unit 23 performs processing of changing an output of the another avatar using the information on the another avatar received in step S728. The terminal output unit 26 changes the output of the another avatar. The process returns to step S701. Note that the processing of changing the output of the another avatar using the information on the another avatar is a known technique.

Figure 7:
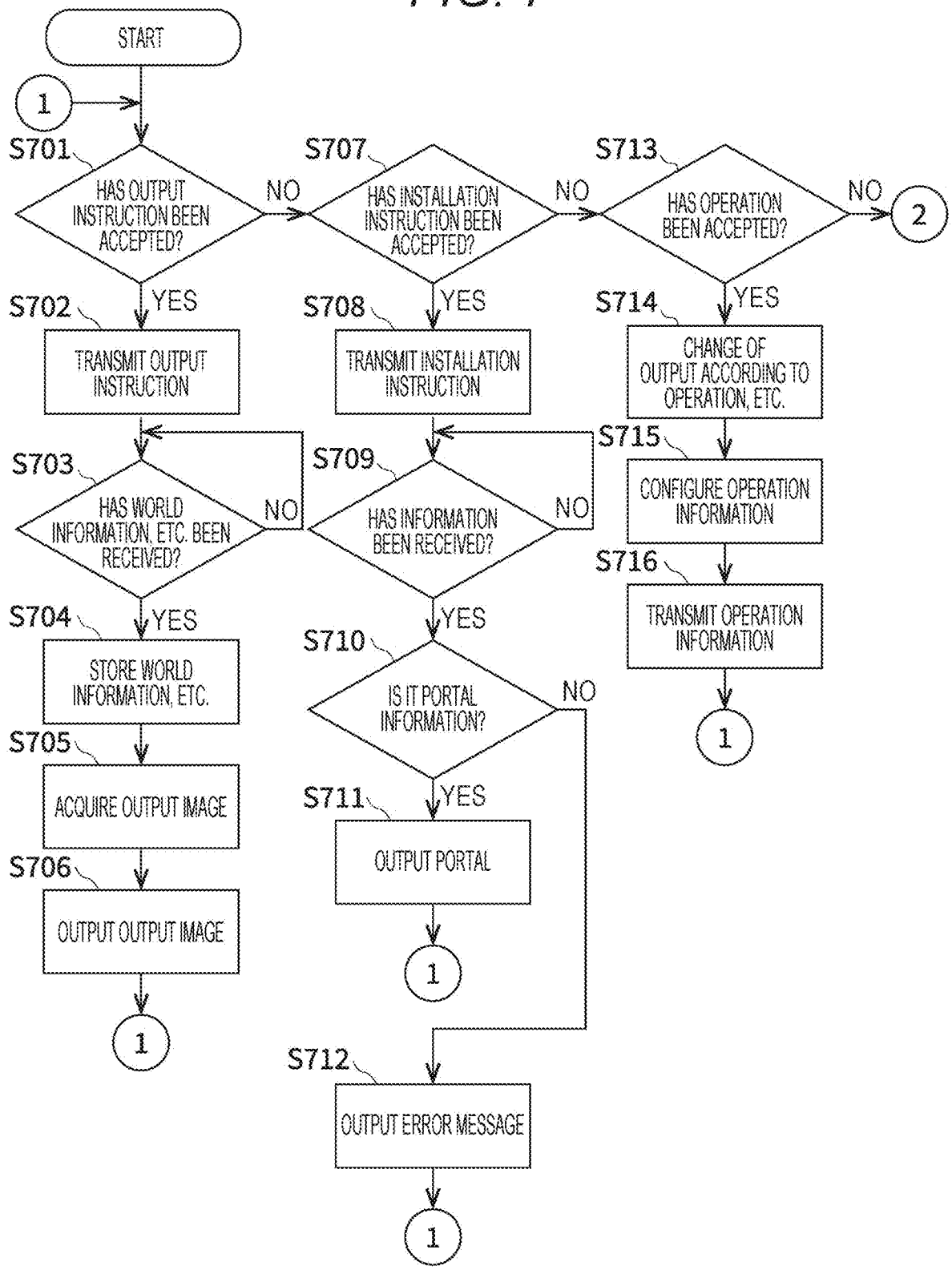
FIG. 7 is a flowchart illustrating an operation example of a user terminal according to one or more aspects of the disclosed subject matter.

Note that the user terminal 2 outputs the portal into the world by using the portal information received from the information processing device 1 after transmitting the installation instruction in the flowchart of FIG. 7. However, the user terminal 2 may output the portal into the world in response to the received installation instruction, and then, transmit the portal information of the installed portal to the information processing device 1. The process of processing until a portal according to an installation instruction input by one user is installed in one or more user terminals 2 is not particularly limited.

Figure 8:
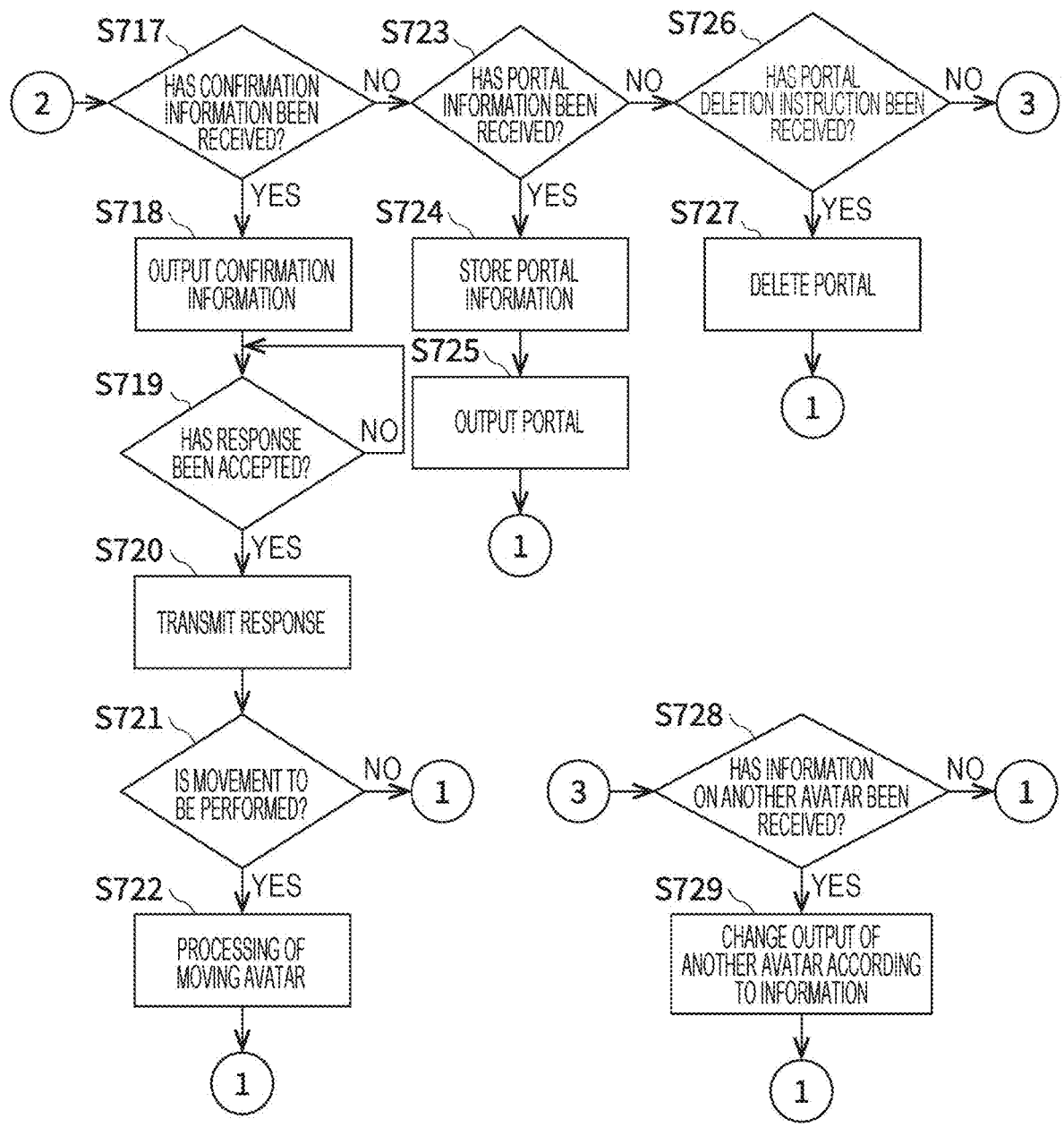
FIG. 8 is a flowchart illustrating the operation example of the user terminal according to one or more aspects of the disclosed subject matter.

Note that the process ends due to power-off and/or an interruption ending the process in the flowcharts of FIGS. 7 and 8.

Hereinafter, a specific operation example of the information system A according to the present embodiment will be described.

Here, it is assumed that the terminal information storage unit 111 of the information processing device 1 stores a terminal information management table having a structure illustrated in FIG. 9. The terminal information management table is a table that manages terminal information. The terminal information management table manages one or more records having a "terminal identifier", a "world identifier", an "avatar identifier", an "installation condition", a "deletion condition", a "confirmation condition", and a "movement condition". The "terminal identifier" is information for identifying the user terminal 2. The "world identifier" is information for identifying a world output on the user terminal 2. The "avatar identifier" is information for identifying an avatar corresponding to a user who uses the user terminal 2. The "installation condition (installation authority)" is a condition for the user (avatar) who uses the user terminal 2 to install a portal, and here, is information indicating whether or not the user has authority to install the portal. An attribute value "1" of the "installation condition (installation authority)" means that the user has the installation authority, and an attribute value "0" means that the user does not have the installation authority. Here, the "deletion condition" is a condition for deleting a portal installed in the past in a case where the user installed the portal. An attribute value "2 or less" of the "deletion condition" indicates that the user can install up to two portals, and means that a portal whose installation date and time is the oldest, the portal having been installed by the same user, is deleted in a case where the third portal has been installed. An attribute value "maximum 1" of the "deletion condition" indicates that the user can install only one portal, and means that a portal whose installation date and time is the oldest, the portal having been installed by the same user, is deleted in a case where the second portal has been installed. The "confirmation condition" indicates whether or not to make the user perform confirmation when movement is to be performed, and indicates that the user is caused to perform confirmation when movement is to be performed regarding the user terminal 2 identified by a terminal identifier corresponding to a confirmation condition "1". On the other hand, it indicates that movement is performed without causing the user to perform confirmation when the movement is to be performed regarding the user terminal 2 identified by a terminal identifier corresponding to a confirmation condition "0". The "movement condition" is a condition for performing movement using a portal. A movement condition "contact (distance=0)" indicates that contact between an avatar and the portal is a condition. A movement condition "distance<=1" indicates that a condition is that a distance between the avatar and the portal is "1 or less" in a virtual space. A movement condition "−1" indicates that the avatar corresponding to the user terminal 2 identified by the corresponding terminal identifier is not movable using the portal.

In addition, it is assumed that the world storage unit 112 stores a world information management table illustrated in FIG. 10. The world information management table is a table that manages one or more records having a "world identifier" and "world information".

In addition, it is assumed that the avatar storage unit 113 stores an avatar information management table illustrated in FIG. 11. The avatar information management table is a table that manages one or more records having an "avatar identifier" and "avatar information".

In addition, it is assumed that the portal storage unit 114 stores a portal information management table illustrated in FIG. 12. The portal information management table is a table that manages one or more records having a "portal identifier", a "portal attribute value", a "date and time", and a "terminal identifier". Here, the "portal attribute value" includes a "bidirectional flag", a "first identifier", a "second identifier", "first installation position information", "second installation position information", "first movement position information", "second movement position information", and a "portal image".

The "date and time" indicates a date and time when a portal has been installed. The "terminal identifier" indicates the user terminal 2 that has transmitted a portal installation instruction. Regarding the bidirectional flag, "0" indicates a unidirectional portal, and "1" indicates a bidirectional portal. The "portal image" is information specifying an image of the portal, and here, for example, is a file name.

In addition, the portal storage unit 114 stores a portal image illustrated in FIG. 13. The portal image has an entity of a portal image corresponding to a file name.

Figure 14:
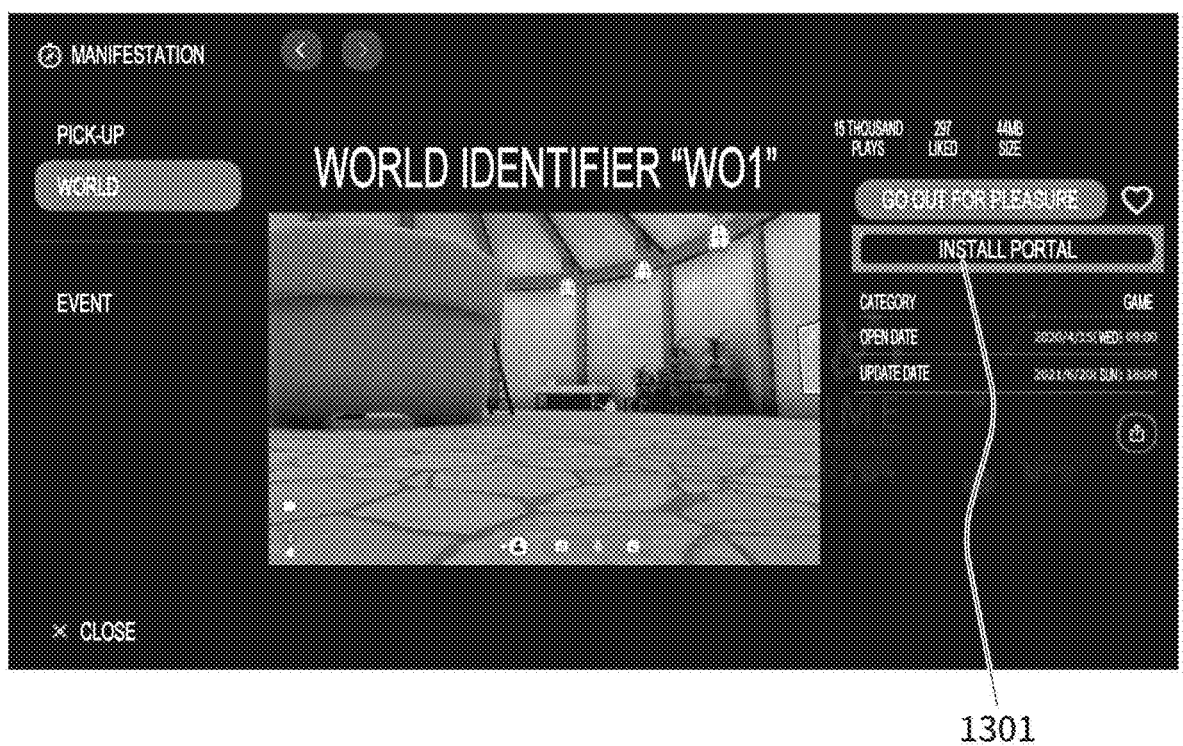
FIG. 14 is a view illustrating a screen example of the user terminal according to one or more aspects of the disclosed subject matter.

In this situation, it is assumed that a world identified by a world identifier "W01" is displayed on the user terminal 2 identified by a terminal identifier "T01". Further, it is assumed that the user terminal 2 currently displays a screen illustrated in FIG. 14. Note that it is assumed that world information is transmitted from the information processing device 1 to the user terminal 2, and the user terminal 2 receives and outputs the world information in the process up to the output in FIG. 14.

Next, it is assumed that a user corresponding to the terminal identifier "T01" has pressed an "install portal" button 1301. It is assumed that the screen of the user terminal 2 then transitions to a screen for determining an installation position of the portal as illustrated in FIG. 15.

Figure 15:
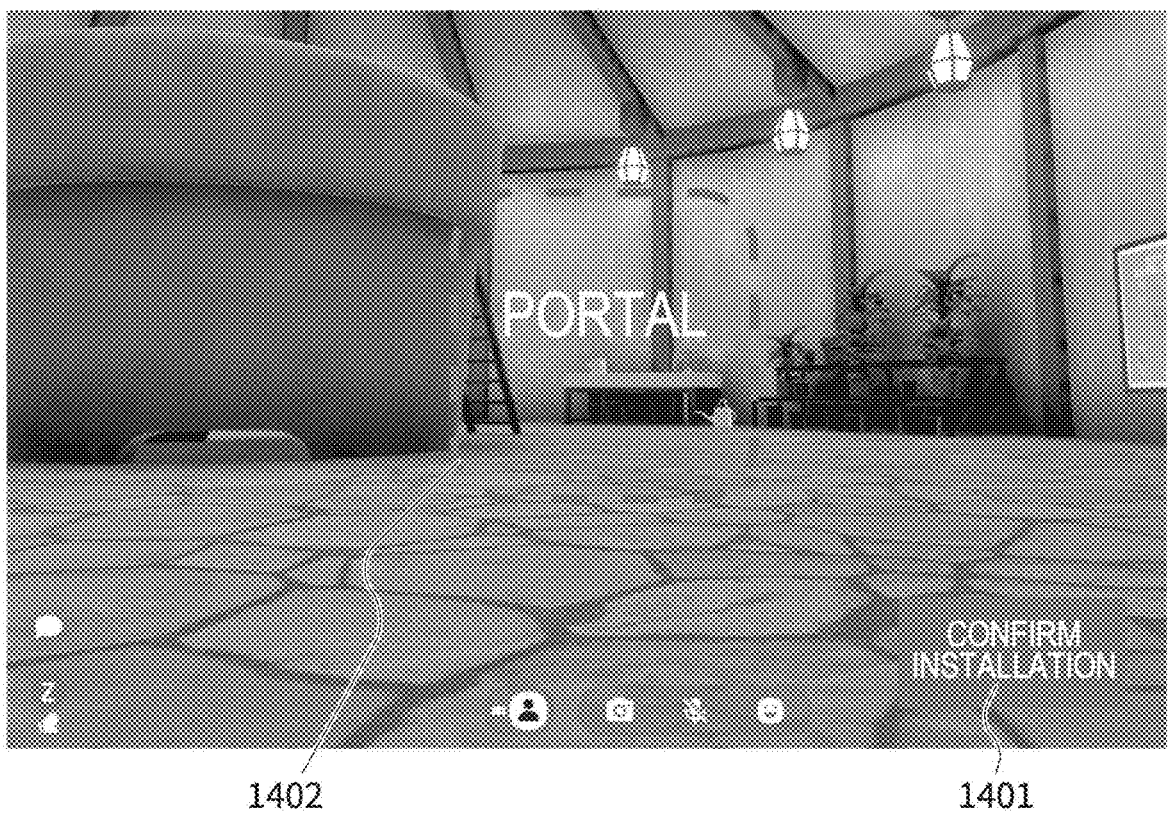
FIG. 15 is a view illustrating a screen example of the user terminal according to one or more aspects of the disclosed subject matter.

Next, it is assumed that the user has pressed an "installation confirmation" button in the state of FIG. 15. Then, the terminal acceptance unit 22 accepts an installation instruction.

Note that it is assumed that the installation instruction includes a first identifier "W01" that specifies world information, a second identifier "W02" that specifies a world (second VR space) as a movement destination, first installation position information $(x_5, y_5, z_5)$ specified by a portal installation frame 1402, default second movement position information $(X_0, Y_0, Z_0)$, and "P01.jpg" that specifies a portal image. In addition, it is assumed in FIG. 14 that the second identifier "W02" that specifies the world (second VR space) as the movement destination has been input by the user although not illustrated. In addition, it is assumed that "P01.jpg" that specifies the portal image has been previously selected by the user from two or more portal images (see FIG. 13) although not illustrated.

In addition, it is assumed that the terminal processing unit 23 has read the default second movement position information $(X_0, Y_0, Z_0)$ from the terminal storage unit 21 since the second movement position information has not been designated by the user. Further, it is assumed that the terminal processing unit 23 has read the default bidirectional flag "0" from the terminal storage unit 21. In addition, the terminal processing unit 23 reads the terminal identifier "T01" from the terminal storage unit 21.

Next, the terminal processing unit 23 uses the received installation instruction and the terminal identifier "T01" to configure an installation instruction to be transmitted of "<Terminal Identifier>T01<Bidirectional Flag>0<First Identifier>W01<Second Identifier>W02<First Installation Position Information>$(x_5, y_5, z_5)$<Second Movement Position Information>$(X_0, Y_0, Z_0)$<Portal Image>P01.jpg". Next, the terminal transmission unit 24 transmits the installation instruction to the information processing device 1.

Next, the installation instruction acceptance unit 121 of the information processing device 1 receives the installation instruction from the user terminal 2.

Then, the processing unit 13 performs portal installation processing as follows. That is, the installation determination unit 131 acquires the installation authority "1" paired with "<Terminal Identifier>T01" included in the installation instruction from the terminal information management table in FIG. 9. Then, the installation determination unit 131 determines that the installation condition is satisfied from the installation authority "1".

Next, the installation processing unit 132 acquires one or more portal attribute values of "<Bidirectional Flag>0<First Identifier>W01<Second Identifier>W02<First Installation Position Information>$(x_5, y_5, z_5)$<Second Movement Position Information>$(X_0, Y_0, Z_0)$<Portal Image>P01.jpg" and "<Terminal Identifier>T01" corresponding to the installation instruction.

Next, it is assumed that the installation processing unit 132 has acquired a date and time "2021/9/22 8:54:11" from a clock (not illustrated).

Next, it is assumed that the installation processing unit 132 has generated a unique portal identifier "P58". In addition, the installation processing unit 132 uses the acquired one or more portal attribute values, terminal identifier, and date and time to configure portal information.

Next, the installation processing unit 132 stores a record having the portal identifier "P58" and the portal information in the portal information management table in FIG. 12.

Next, the installation processing unit 132 determines whether or not to transmit the portal information to the user terminal 2 corresponding to each of one or more pieces of terminal information managed in the terminal information management table having the structure illustrated in FIG. 9. Here, the installation processing unit 132 transmits the portal information of "<Bidirectional Flag>0<First Identifier>W01<Second Identifier>W02<First Installation Position Information>$(x_5, y_5, z_5)$<Second Movement Position Information>$(X_0, Y_0, Z_0)$<Portal Image>P01.jpg" and "<Terminal Identifier>T01", identified by the portal identifier "P58", to the user terminal 2 corresponding to an avatar movable using the portal. That is, here, the installation processing unit 132 transmits the portal information to each of the user terminals 2 (terminals with terminal identifier "T01, T02, T03, and so on") corresponding to the terminal information of which the movement condition is not "−1" (not movable) in the terminal information management table. Note that the portal information is not transmitted to the user terminal 2 corresponding to a terminal identifier "T04".

Next, the processing unit 13 performs portal deletion processing as follows. That is, the deletion determination unit 133 acquires the deletion condition "2 or less", which is paired with the terminal identifier "T01" corresponding to the installed portal, from the terminal information management table in FIG. 9.

Next, the deletion determination unit 133 refers to the portal information management table in FIG. 12 and detects that there are three pieces of portal information "P01, P02, and P58" paired with the terminal identifier "T01". Then, the deletion determination unit 133 determines that the deletion condition "2 or less" is not satisfied. Then, the deletion determination unit 133 determines to delete a portal that has the oldest date and time and has the portal identifier "P01" from among portals identified by the portal identifiers "P01, P02, and P58".

Next, the deletion processing unit 134 deletes portal information (a record) of the portal identifier "P01" from the portal information management table (FIG. 12).

Next, the deletion processing unit 134 transmits a portal deletion instruction including the portal identifier "P01" to the user terminals 2 (terminals with the terminal identifier s"T01, T02, T03, and so on") corresponding to terminal information other than the movement condition "−1".

Next, the terminal reception unit 25 of each of the user terminals 2 having the terminal identifier "T01, T02, T03, and so on" receives portal information of the newly installed portal identifier "P58". Next, the terminal processing unit 23 of each of the user terminals 2 stores the received portal information in the terminal storage unit 21. Next, the terminal processing unit 23 of each of the user terminals 2 uses the received portal information to configure a portal to be output. The terminal output unit 26 of each of the user terminals 2 outputs the portal to a VR space.

Figure 16:
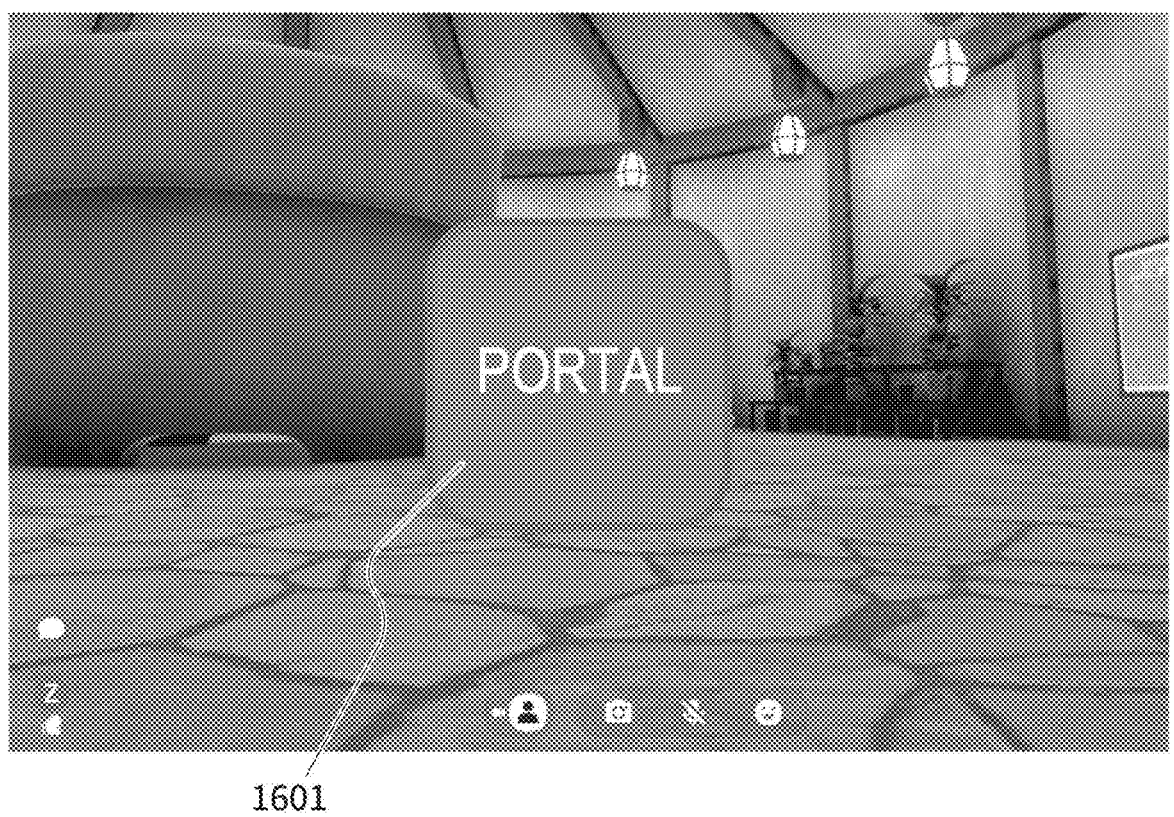
FIG. 16 is a view illustrating a screen example of the user terminal according to one or more aspects of the disclosed subject matter.

A display example of the new portal in the user terminal 2 is illustrated in FIG. 16. Reference numeral 1601 in FIG. 16 denotes the newly installed portal.

In addition, the terminal reception unit 25 of each of the user terminals 2 with the terminal identifier "T01, T02, T03, and so on" receives the deletion instruction including the portal identifier "P01" from the terminal reception unit 25. Next, the terminal processing unit 23 of each of the user terminals 2 deletes the portal information corresponding to the received deletion instruction from the terminal storage unit 21. In addition, the terminal processing unit 23 of each of the user terminals 2 configures an output image that hides the portal corresponding to the deletion instruction not to be displayed. Then, the terminal output unit 26 of each of the user terminals 2 hides the portal not to be displayed.

Figure 17:
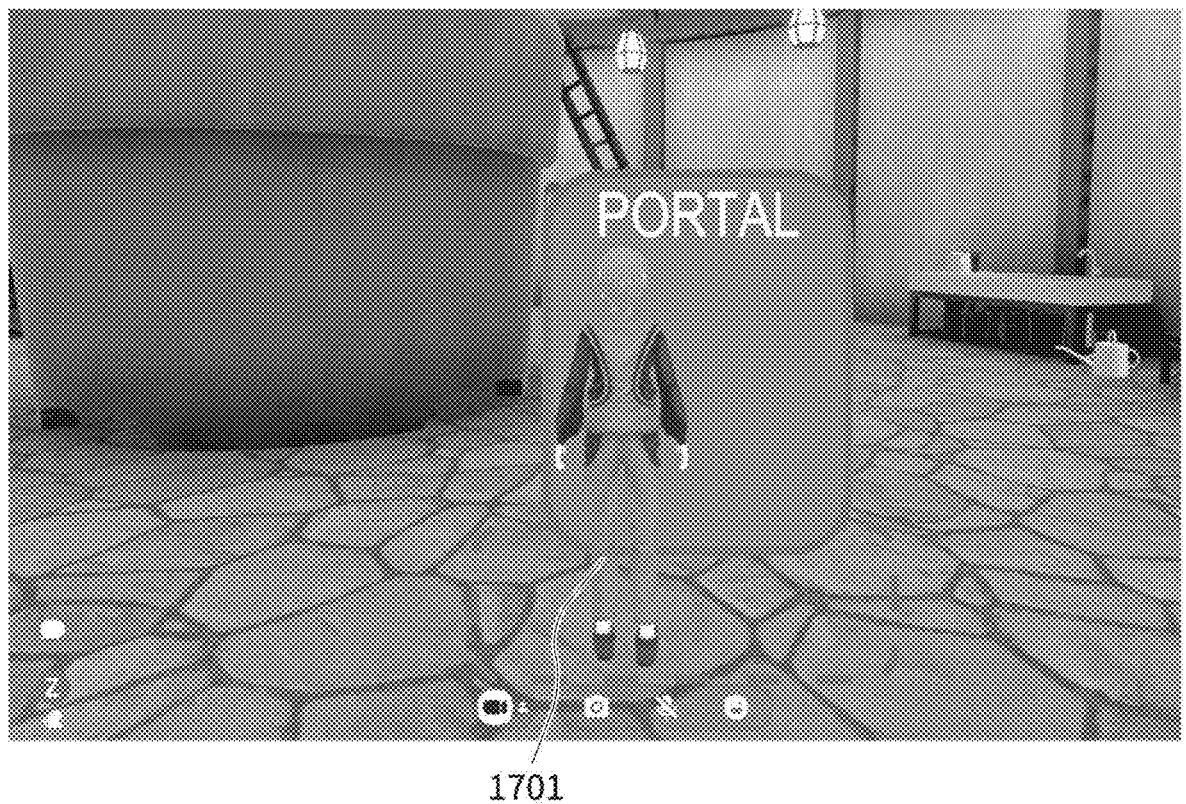
FIG. 17 is a view illustrating a screen example of the user terminal according to one or more aspects of the disclosed subject matter.

Next, it is assumed that the user with the terminal identifier "T01" operates the user terminal 2 to move the avatar 1701 until coming into contact with the portal (see FIG. 17).

Next, the user terminal 2 acquires operation information (here, including position information of the avatar) generated by the operation, and transmits the operation information to the information processing device 1.

Next, the acceptance unit 12 of the information processing device 1 receives the operation information including the position information of the avatar from the user terminal 2 with the terminal identifier "T01".

Next, the movement determination unit 136 acquires the movement condition "contact (distance=0)" paired with the terminal identifier "T01" from the table of FIG. 9. Next, the movement determination unit 136 acquires the world identifier "W01" paired with the terminal identifier "T01" from the table in FIG. 9. Next, the movement determination unit 136 acquires the first installation position information $(x_5, y_5, z_5)$ of the portal information of the portal identifier "P58" paired with the world identifier "W01" and a size of a portal image. Then, the movement determination unit 136 uses the position information of the avatar included in the operation information, the first installation position information $(x_5, y_5, z_5)$, and the size of the portal image to determine that a distance between the avatar and the portal of the portal identifier "P58" is 0. That is, the movement determination unit 136 determines that the movement condition is satisfied.

Next, the confirmation processing unit 135 acquires the confirmation condition "1" paired with the terminal identifier "T01" from the table of FIG. 9. Then, the confirmation processing unit 135 determines to confirm whether to perform the movement processing. Then, the confirmation processing unit 135 acquires screen information for the confirmation from the storage unit 11, and transmits the screen information to the user terminal 2 that has transmitted the installation instruction.

Figure 18:
FIG. 18 is a view illustrating a screen example of the user terminal according to one or more aspects of the disclosed subject matter.

Next, the user terminal 2 with the terminal identifier "T01" receives the screen information, and outputs a screen illustrated in FIG. 18 using the screen information.

Next, it is assumed that the user has pressed a "move" button 1801 in FIG. 18.

Then, the terminal acceptance unit 22 accepts a response "move" from the user. Next, the terminal processing unit 23 acquires, for example, a portal identifier or a terminal identifier corresponding to the confirmation information, and configures a response associated with the portal identifier or the terminal identifier. The terminal transmission unit 24 transmits the response associated with the portal identifier or the terminal identifier to the information processing device 1.

Next, the response acceptance unit 122 receives the response "move" from the user terminal 2.

Next, the movement processing unit 137 acquires the second identifier "W02" and the second movement position information $(X_0, Y_0, Z_0)$ of the portal information corresponding to the received operation information from the portal storage unit 114. Next, the movement processing unit 137 performs processing of moving an avatar corresponding to the received operation information to a position specified by the second movement position information $(X_0, Y_0, Z_0)$ in the second VR space identified by the acquired second identifier "W02". That is, the movement processing unit 137 transmits an avatar identifier "A01", the second identifier "W02", and the second movement position information $(X_0, Y_0, Z_0)$ to one or more user terminals 2. Note that the one or more user terminals 2 are the user terminals 2 corresponding to the terminal information managed in FIG. 9. In addition, the movement processing unit 137 rewrites the world identifier paired with the terminal identifier "T01" in the terminal information management table of FIG. 9 as "W02".

Then, each of the one or more user terminals 2 receives "<Avatar Identifier>A01<Second Identifier>W02<Second Movement Position Information>$(X_0, Y_0, Z_0)$". Such information is information indicating that the avatar of "A01" has moved to the position $(X_0, Y_0, Z_0)$ in the second VR space of "W02".

Figure 19:
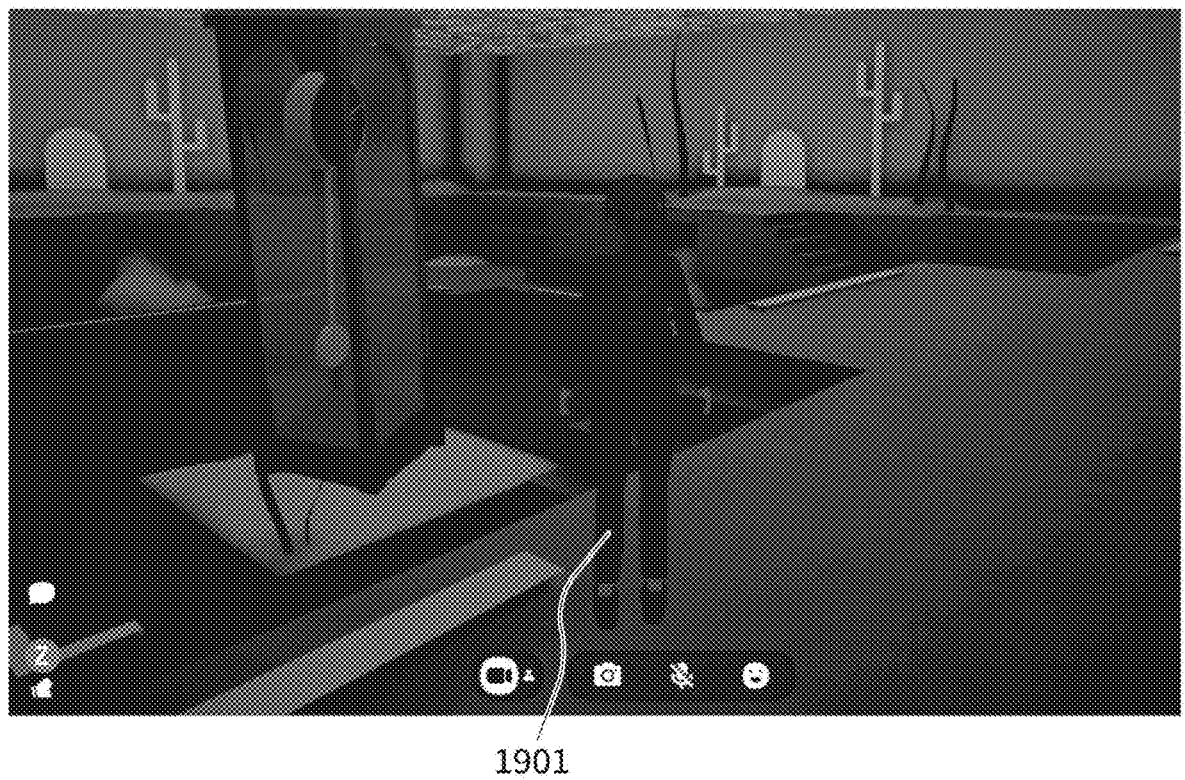
FIG. 19 is a view illustrating a screen example of the user terminal according to one or more aspects of the disclosed subject matter.

Then, in the user terminal 2 outputting the world identifier "W02" and the user terminal 2 with the terminal identifier "T01", the avatar identified by "A01" is output at the position indicated by the position information $(X_0, Y_0, Z_0)$ in the VR space of "W02". Note that such an output example is illustrated in FIG. 19. In FIG. 19, the avatar that has moved is denoted by 1901.

As described above, a portal, which is an object for an avatar to move between VR spaces, can be installed according to the present embodiment. As a result, each avatar can more easily move between different VR spaces.

In addition, a user can designate an attribute value of a portal to be installed according to the present embodiment. As a result, it is possible to arbitrarily set an installation position of the portal, a VR space as a movement destination, and the like, and it is possible to achieve VR experience with a higher degree of freedom for the user.

In addition, it is possible to set a constraint in installation of a portal according to the present embodiment. As a result, it is possible to suppress unlimited creation of a portal that allows movement to a VR space in which only a specific user can originally participate, or the like.

In addition, a constraint can be provided in a case where an avatar moves using a portal according to the present embodiment. As a result, it is possible to suppress movement to a VR space in which only a specific user can originally participate via the portal.

In addition, a user can confirm whether or not to move when an avatar moves according to the present embodiment. As a result, the user can suppress the avatar from unintentionally moving through the portal.

In addition, a portal can be automatically deleted as appropriate according to the present embodiment. As a result, it is possible to reduce the possibility that a malicious user or the like installs a large number of portals to damage experience of other users in a VR space.

In addition, a bidirectional portal, which is an object for an avatar to move bidirectionally between two VR spaces, can be installed according to the present embodiment. As a result, the movement between VR spaces can be more easily performed since not only unidirectional movement but also bidirectional movement can be performed.

In addition, an installed portal can be reflected in another user terminal 2 according to the present embodiment. As a result, it is possible to more easily move to an arbitrary VR space together with another user.

Note that it has been mainly described that the information processing device 1 is the server that provides various services to one or more user terminals 2 according to the present embodiment. However, it may be configured such that two or more information processing devices 1 communicate with each other in a peer-to-peer (P2P) manner. In such a case, the information processing devices 1 are user terminals used by users.

Figure 20:
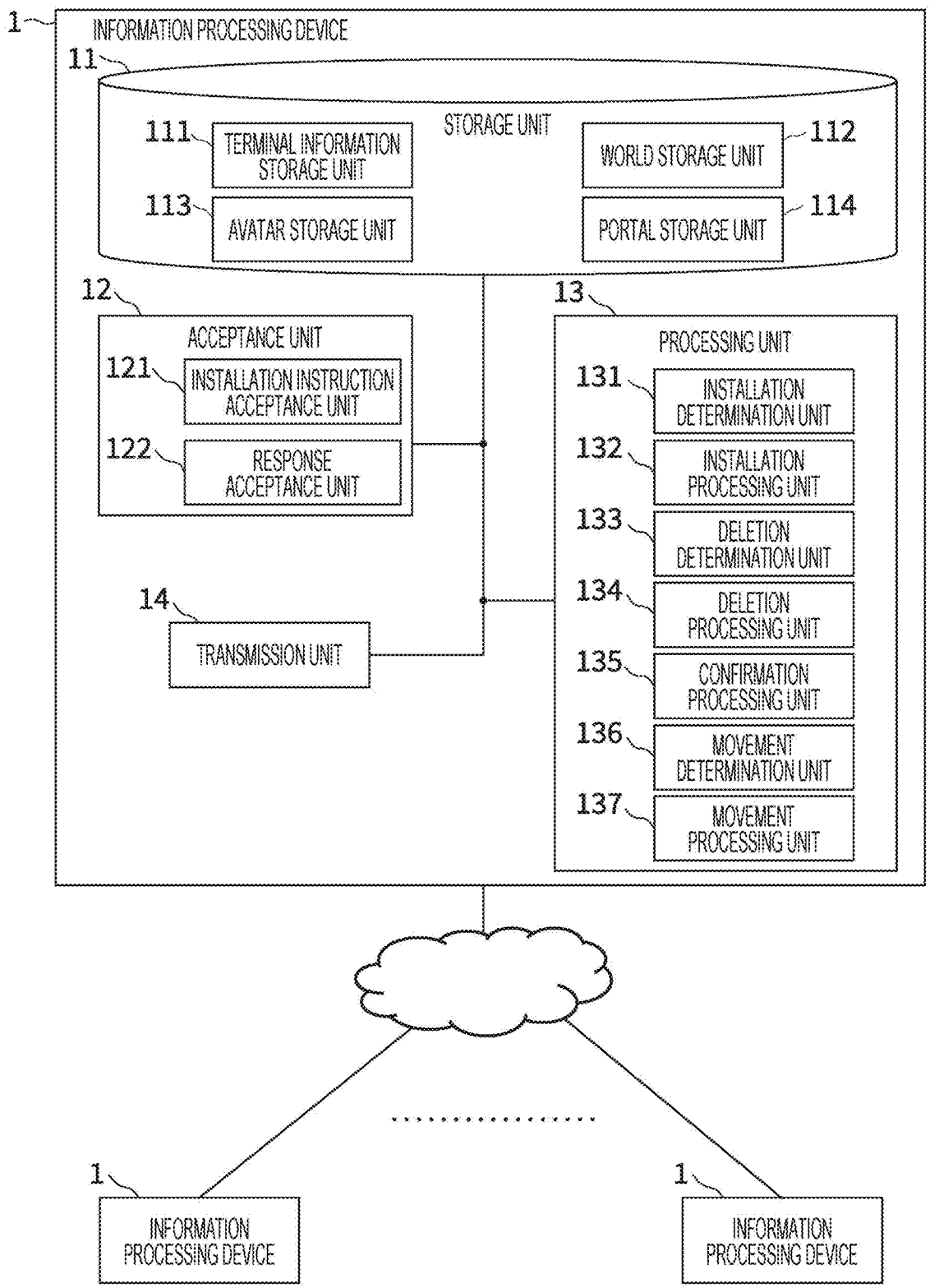
FIG. 20 is a block diagram of an information system B according to one or more aspects of the disclosed subject matter.

An information system B in such a case includes two or more information processing devices 1. FIG. 20 is a block diagram of the information system B. In addition, the acceptance unit 12, the installation instruction acceptance unit 121, and the response acceptance unit 122 in the information processing device 1 constituting the information system B receive instructions and information from a user. In addition, the installation processing unit 132, the deletion processing unit 134, and the movement processing unit 137 in the information processing device 1 transmit various types of information to one or more other information processing devices 1. In addition, the acceptance unit 12 in the information processing device 1 receives operation information or information corresponding to the operation information from one or more other information processing devices 1. In addition, transmission processing of various types of information in the information processing device 1 is information output processing.

In addition, the operation in the information processing device 1 constituting the information system B is substantially similar to the operation in the flowchart of FIG. 3, but the reception in steps S301, S304, S308, and S312 is acceptance of an input from the user. In addition, an output image is output in step S303. In addition, an error message is output in step S406. In addition, portal information is transmitted to one or more other information processing devices 1 in step S413. In addition, a portal is output from the own device in step S413. In addition, the deletion processing unit 134 hides the portal not to be displayed in step S505. In addition, a portal deletion instruction is transmitted to another information processing device 1 in step S606.

Further, the processing in the present embodiment may be implemented by software. The software may be downloaded and distributed. Alternatively, the software may be recorded on a recording medium such as a compact disc read-only memory (CD-ROM) and distributed. Note that this also applies to other embodiments in the present specification. Note that the software for implementing the information processing device 1 according to the present embodiment has the following program. That is, this program is a program for causing a computer to function as: an installation instruction acceptance unit that accepts an installation instruction of a portal, which is an object for an avatar to move from a first VR space to a second VR space, in the first VR space, the installation instruction specifying the first VR space and the second VR space; and an installation processing unit that performs, in response to acceptance of the installation instruction, installation processing for installing the portal in the first VR space in one or more devices including another device other than a device that has accepted an input of the installation instruction.

Figure 21:
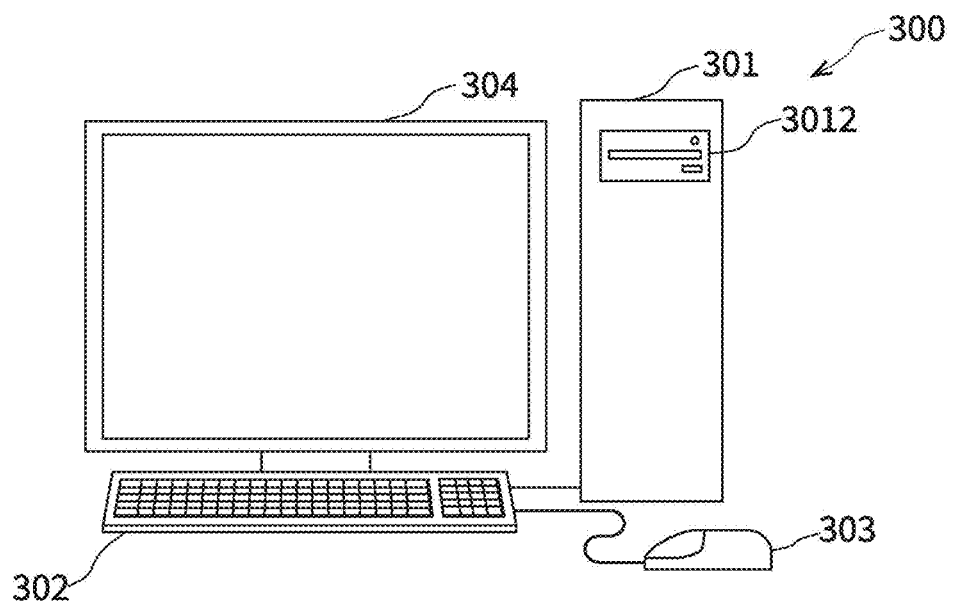
FIG. 21 is a diagram illustrating an appearance of a computer system according to one or more aspects of the disclosed subject matter.

FIG. 21 illustrates an appearance of the computer that executes the program described in the present specification to implement the information processing device 1 and the like according to the embodiment described above. The above-described embodiment can be implemented by computer hardware and a computer program executed on the computer hardware. FIG. 21 is a schematic diagram of a computer system 300, and FIG. 22 is a block diagram of the system 300.

In FIG. 21, the computer system 300 includes a computer 301 including a CD-ROM drive, a keyboard 302, a mouse 303, and a monitor 304.

Figure 22:
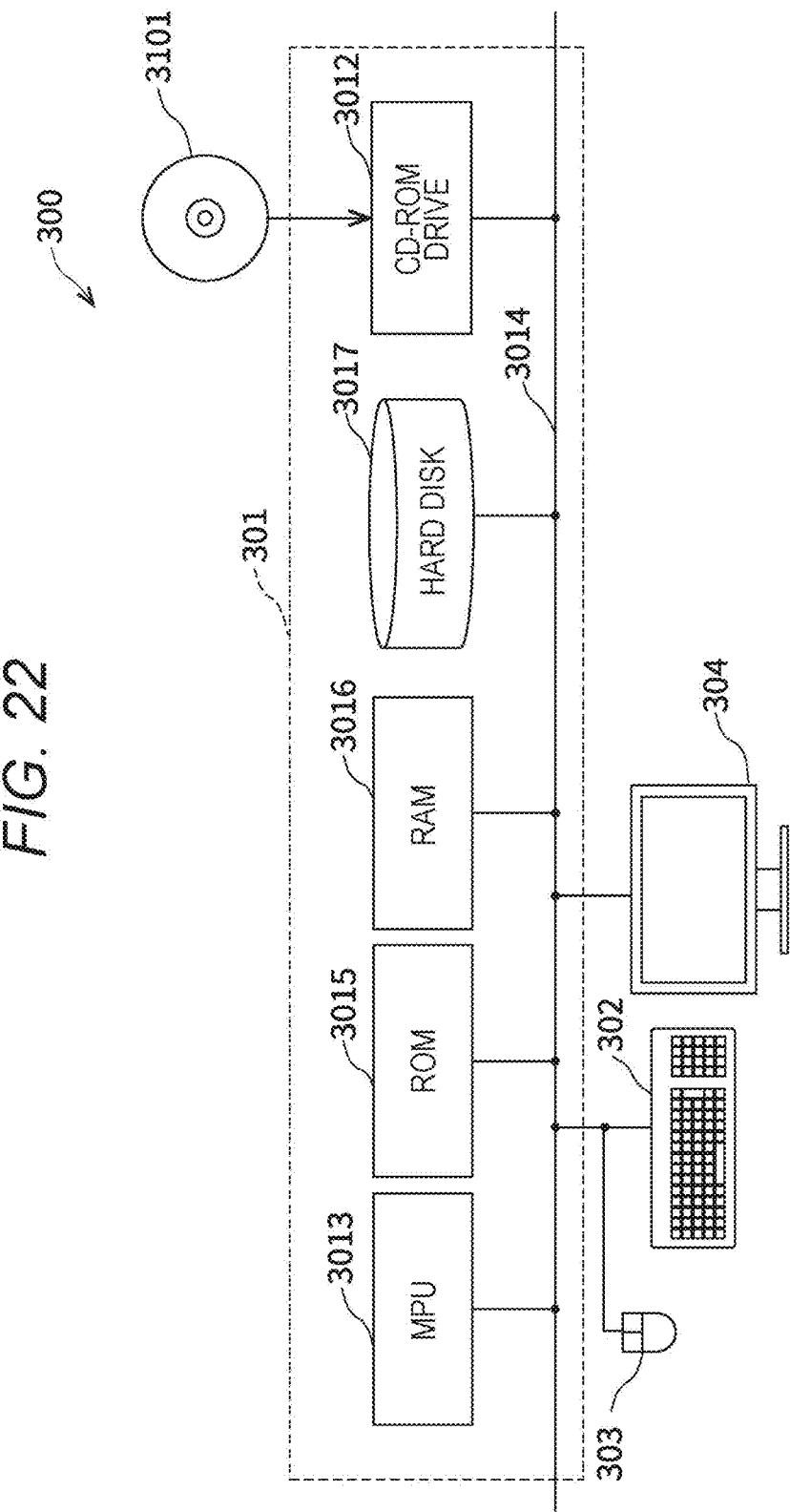
FIG. 22 is a block diagram of the computer system according to one or more aspects of the disclosed subject matter.

In FIG. 22, the computer 301 includes, in addition to the CD-ROM drive 3012, an MPU 3013, a bus 3014 connected to the CD-ROM drive 3012 and the like, a ROM 3015 for storing a program such as a boot-up program, a random access memory (RAM) 3016 connected to the MPU 3013 for temporarily storing an instruction of an application program and providing a temporary storage space, and a hard disk 3017 for storing the application program, a system program, and data. Although not illustrated, the computer 301 may further include a network card that provides connection to a local area network (LAN).

A program for causing the computer system 300 to execute the functions of the information processing device and the like according to the above-described embodiment may be stored in the CD-ROM 3101 which is inserted into the CD-ROM drive 3012, and further transferred to the hard disk 3017. Alternatively, the program may be transmitted to the computer 301 via a network (not illustrated) and stored in the hard disk 3017. The program is loaded into the RAM 3016 at the time of execution. The program may be directly loaded from the CD-ROM 3101 or the network.

The program does not necessarily include an operating system (OS), a third-party program, or the like that causes the computer 301 to execute the functions of the information processing device and the like according to the above-described embodiment. The program only needs to include a portion of an instruction that calls an appropriate function (module) in a controlled manner to obtain a desired result. How the computer system 300 works is well known, and a detailed description thereof will be omitted.

Note that, in the above program, the step of transmitting information, the step of receiving information, and the like do not include processing performed by hardware, for example, processing performed by a modem, an interface card, or the like in the transmission step (processing performed only by hardware).

The number of computers that execute the program may be one or more. That is, centralized processing or distributed processing may be performed.

In addition, in the above embodiment, it is obvious that two or more communication means in one device may be physically achieved by one medium.

In addition, in the above embodiment, each processing may be achieved by centralized processing using a single device, or may be achieved by distributed processing using a plurality of devices.

It is obvious that the present disclosure is not limited to the above embodiment, and various modifications are possible and are also included in the scope of the present disclosure.

As described above, the present disclosure has an effect of being capable of installing the portal, which is the object for the avatar to move between the VR spaces, and is advantageous when being applied as the information processing device or the like.

What is claimed is:

1. An information processing device, comprising:
processing circuitry configured to
receive an installation instruction of a portal, which is an object for an avatar to move from a first VR space to a second VR space, in the first VR space, the installation instruction specifying the first VR space and the second VR space, the installation instruction having first installation position information specifying an installation position of the portal in the first VR space and a second identifier specifying the second VR space, wherein the installation position is arbitrarily set based on a user selection;
determine whether or not installation of the portal corresponding to the installation instruction satisfies an installation condition for installation of the portal, wherein the installation condition is based on the user terminal that has accepted the installation instruction having installation authority and a number of installed portals being less than a threshold; and
in response to acceptance of the installation instruction, install the portal in the first VR space in two or more user terminals, wherein in a case having a plurality of user terminals, the plurality of user terminals includes another user terminal other than a user terminal that has accepted the installation instruction.

2. The information processing device according to claim 1, wherein the processing circuitry is further configured to install the portal in the first VR space in one or more user terminals including another user terminal other than a user terminal that has accepted the installation instruction when the installation determination unit determines that the installation condition is satisfied.

3. The information processing device according to claim 2, wherein
the processing circuitry is further configured to
determine whether or not the user corresponding to the user terminal that has accepted the installation instruction has the installation authority, and
perform the installation in response to a determination that the user has the installation authority.

4. The information processing device according to claim 1, wherein the processing circuitry is further configured to
determine whether or not a movement condition for movement of the avatar based on the portal is satisfied, and
move the avatar from the first VR space to the second VR space in response to a determination that the movement condition is satisfied.

5. The information processing device according to claim 4, wherein
the movement condition includes a distance condition based on a distance between the portal and the avatar, wherein the processing circuitry is further configured to
determine whether or not the distance between the portal and the avatar is a distance that satisfies the distance condition, and perform the movement in response to a determination that the distance condition is satisfied.

6. The information processing device according to claim 4, wherein the processing circuitry is further configured to
confirm whether or not to move from the first VR space to the second VR space, which correspond to the portal, in response to the avatar satisfying a predetermined confirmation condition, and
receive a response corresponding to the confirmation,
wherein the avatar moves from the first VR space to the second VR space in response to the response received is information indicating movement.

7. The information processing device according to claim 6, wherein the processing circuitry is further configured to
determine whether or not a deletion condition for deleting the portal is satisfied, and
delete the portal for which the deletion condition is satisfied.

8. The information processing device according to claim 1, wherein the processing circuitry is further configured to
determine whether or not a movement condition for movement of the avatar based on the portal is satisfied, and
move the avatar from the first VR space to the second VR space in response to a determination that the movement condition is satisfied,
wherein the movement condition includes presence of a movement ticket corresponding to the avatar, and
the movement is not performed in response to a determination that the movement ticket corresponding to the avatar is not present.

9. The information processing device according to claim 1, wherein the processing circuitry is further configured to
determine whether or not a deletion condition for deleting a portal is satisfied, and
delete the portal for which the deletion condition is satisfied,
wherein the deletion condition is that one user has installed portals equal to or more than a threshold or more than the threshold, and
delete a portal installed by the user corresponding to the received installation instruction, the portal being installed in the past.

10. The information processing device according to claim 1, wherein the portal allows bidirectional movement including movement from the first VR space to the second VR space corresponding to the portal and movement from the second VR space to the first VR space.

11. The information processing device according to claim 10, wherein the installation instruction has one or more pieces of position information of second installation position information specifying an installation position of the portal in the second VR space and first movement position information specifying an initial position in the first VR space when the avatar has moved to the first VR space based on the portal.

12. The information processing device according to claim 1, wherein the processing circuitry is further configured to
store one or more pieces of portal information,
store one or more pieces of terminal information related to user terminals,
configure portal information corresponding to the installation instruction in response to receiving the installation instruction,
store the portal information, and
transmit the portal information to the one or more user terminals respectively corresponding to the terminal information of the one or more stored pieces of terminal information.

13. The information processing device according to claim 1, wherein the second VR space is arbitrarily set based on a user selection from a plurality of VR spaces.

14. An information processing method, comprising:
receiving, by processing circuitry, an installation instruction of a portal, which is an object for an avatar to move from a first VR space to a second VR space, in the first VR space, the installation instruction specifying the first VR space and the second VR space, the installation instruction having first installation position information specifying an installation position of the portal in the first VR space and a second identifier specifying the second VR space, wherein the installation position is arbitrarily set based on a user selection;
determining whether or not installation of the portal corresponding to the installation instruction satisfies an installation condition for installation of the portal, wherein the installation condition is based on the user terminal that has accepted the installation instruction having installation authority and a number of installed portals being less than a threshold; and
installing, by the processing circuitry, the portal in the first VR space in one or more devices, wherein in a case having a plurality of user terminals, the plurality of user terminals includes another device other than a device that has accepted an input of the installation instruction in response to acceptance of the installation instruction.

15. A non-transitory computer-readable storage medium storing computer-readable instructions thereon which when executed by a computer cause the computer to perform a method, the method comprising:
receiving an installation instruction of a portal, which is an object for an avatar to move from a first VR space to a second VR space, in the first VR space, the installation instruction specifying the first VR space and the second VR space, the installation instruction having first installation position information specifying an installation position of the portal in the first VR space and a second identifier specifying the second VR space, wherein the installation position is arbitrarily set based on a user selection;
determining whether or not installation of the portal corresponding to the installation instruction satisfies an installation condition for installation of the portal, wherein the installation condition is based on the user terminal that has accepted the installation instruction having installation authority and a number of installed portals being less than a threshold; and
in response to receiving the installation instruction, installing the portal in the first VR space in one or more devices including another device other than a device that has accepted an input of the installation instruction.

* * * * *